US012748339B2

(12) United States Patent
Uebel et al.

(10) Patent No.: US 12,748,339 B2
(45) Date of Patent: Sep. 29, 2026

(54) OPTICAL ELEMENT FOR GENERATION OF BROADBAND RADIATION

(71) Applicant: ASML NETHERLANDS B.V., Veldhoven (NL)

(72) Inventors: Patrick Sebastian Uebel, Marloffstein (DE); Willem Richard Pongers, Veldhoven (NL); Ralph Jozef Johannes Gerardus Anna Maria Smeets, Veldhoven (NL); Amir Abdolvand, Eindhoven (NL); Krishnaparvathy Puthankovilakam, Eindhoven (NL)

(73) Assignee: ASML NETHERLANDS B.V., Veldhoven (NL)

( * ) Notice: Subject to any disclaimer, the term of this patent is extended or adjusted under 35 U.S.C. 154(b) by 172 days.

(21) Appl. No.: 18/287,160

(22) PCT Filed: Apr. 12, 2022

(86) PCT No.: PCT/EP2022/059799
§ 371 (c)(1),
(2) Date: Oct. 16, 2023

(87) PCT Pub. No.: WO2022/233547
PCT Pub. Date: Nov. 10, 2022

(65) Prior Publication Data

US 2024/0201561 A1 Jun. 20, 2024

(30) Foreign Application Priority Data

May 3, 2021 (EP) .................................... 21171747
Jun. 15, 2021 (EP) .................................... 21179394

(51) Int. Cl.
*G02B 6/02* (2006.01)
*G02F 1/35* (2006.01)
*G02F 1/365* (2006.01)

(52) U.S. Cl.
CPC ......... *G02F 1/365* (2013.01); *G02B 6/02328* (2013.01); *G02F 1/3528* (2021.01)

(58) Field of Classification Search
CPC .............. G02B 6/02328; G02B 6/3807; G02B 6/4486; G02B 6/02304; G02B 6/032; C03B 37/0122
See application file for complete search history.

(56) References Cited

U.S. PATENT DOCUMENTS 6,020,964 A 2/2000 Loopstra et al.
6,952,253 B2 10/2005 Lof et al.
(Continued)

FOREIGN PATENT DOCUMENTS

CN 110673256 1/2020
EP 1628164 2/2006
(Continued)

OTHER PUBLICATIONS

International Search Report and Written Opinion issued in corresponding PCT Patent Application No. PCT/EP2022/059799 dated Aug. 1, 2022.
(Continued)

*Primary Examiner* — Eric Wong
(74) *Attorney, Agent, or Firm* — Pillsbury Winthrop Shaw Pittman, LLP

(57) ABSTRACT

A monolithic optical element for generating broadband radiation upon receiving input radiation at an input end of the optical element is disclosed, the optical element including: a hollow core region for guiding the input radiation along a longitudinal axis of the optical element towards an
(Continued)

output end of the optical element; a cladding region surrounding the core region along the longitudinal axis and including transversally arranged micro-structures configured to provide non-linear optical behavior to the optical element causing the generation of the broadband radiation; and a supporting region surrounding the cladding region along the longitudinal axis of at least part of the optical element, wherein the supporting region has a transversal dimension which is sufficiently large to render the at least part of the optical element substantially rigid.

20 Claims, 9 Drawing Sheets

(56) References Cited

U.S. PATENT DOCUMENTS

| | | | |
|---|---|---|---|
| 7,265,364 | B2 | 9/2007 | Teunissen et al. |
| 7,646,471 | B2 | 1/2010 | Teunissen et al. |
| 7,701,577 | B2 | 4/2010 | Straaijer et al. |
| 7,791,724 | B2 | 9/2010 | Den Boef et al. |
| 8,115,926 | B2 | 2/2012 | Straaijer |
| 8,553,227 | B2 | 10/2013 | Jordanoska |
| 8,681,312 | B2 | 3/2014 | Straaijer et al. |
| 8,692,994 | B2 | 4/2014 | Straaijer |
| 8,792,096 | B2 | 7/2014 | Straaijer |
| 8,797,554 | B2 | 8/2014 | Straaijer |
| 8,823,922 | B2 | 9/2014 | Den Boef |
| 2007/0058173 | A1 | 3/2007 | Holzapfel |
| 2009/0195768 | A1 | 8/2009 | Bijnen et al. |
| 2010/0233600 | A1 | 9/2010 | Den Boef et al. |
| 2010/0328655 | A1 | 12/2010 | Den Boef |
| 2011/0026032 | A1 | 2/2011 | Den Boef et al. |
| 2011/0102753 | A1 | 5/2011 | Van De Kerkhof et al. |
| 2011/0249244 | A1 | 10/2011 | Leewis et al. |
| 2012/0044470 | A1 | 2/2012 | Smilde et al. |
| 2013/0162996 | A1 | 6/2013 | Straaijer et al. |
| 2016/0161863 | A1 | 6/2016 | Den Boef et al. |
| 2016/0370717 | A1 | 12/2016 | Den Boef et al. |
| 2019/0324197 | A1 | 10/2019 | Lyngsøe et al. |
| 2020/0319400 | A1 * | 10/2020 | Uebel .................. G02B 6/4415 |
| 2020/0400880 | A1 | 12/2020 | Bauerschmidt et al. |
| 2021/0063894 | A1 | 3/2021 | Bauerschmidt et al. |
| 2021/0124112 | A1 | 4/2021 | Uebel et al. |
| 2021/0396927 | A1 * | 12/2021 | Harker ............... G02B 6/02328 |
| 2022/0069537 | A1 * | 3/2022 | Travers ................. G02F 1/3507 |
| 2022/0187532 | A1 * | 6/2022 | Unnimadhava Kurup Soudamini Amma ....................... G02B 6/032 |

FOREIGN PATENT DOCUMENTS

| | | |
|---|---|---|
| EP | 3136143 | 3/2017 |
| EP | 3705942 | 9/2020 |
| EP | 3715944 | 9/2020 |
| EP | 3715945 | 9/2020 |
| EP | 3816721 | 5/2021 |
| JP | 2022524590 | 5/2022 |
| WO | 2011012624 | 2/2011 |
| WO | 2016102127 | 6/2016 |
| WO | 2020/214088 | 10/2020 |

OTHER PUBLICATIONS

Communication issued in corresponding European Patent Application No. 22722277.5, dated Sep. 8, 2025.

Office Action issued in corresponding Japanese Patent Application No. 2023-563987, dated Feb. 13, 2026.

Office Action issued in corresponding Japanese Patent Application No. 2023-563987, dated Jul. 17, 2026.

* cited by examiner

OPTICAL ELEMENT FOR GENERATION OF BROADBAND RADIATION

CROSS-REFERENCE TO RELATED APPLICATIONS

This application is the U.S. national phase entry of PCT Patent Application No. PCT/EP2022/059799 which was filed Apr. 12, 2022, which claims priority of European Patent Application No. 21171747.5 which was filed on May 3, 2021, and European Patent Application No. 21179394.8 which was filed on Jun. 15, 2021, and which is incorporated herein in its entirety by reference.

FIELD

The present invention relates to an optical element for generation of broadband radiation, specifically a monolithic elongate body comprising one or more hollow-core regions surrounded by corresponding micro-structured cladding regions which are configured to confine radiation travelling through the hollow core region(s) and provide said generation of broadband radiation.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1\times\lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET).

Alternatively, tight control loops for controlling a stability of the lithographic apparatus may be used to improve reproduction of the pattern at low k1.

In the field of lithography, many measurement systems may be used, both within a lithographic apparatus and external to a lithographic apparatus. Generally, such a measurements system may use a radiation source to irradiate a target with radiation, and a detection system operable to measure at least one property of a portion of the incident radiation that scatters from the target. An example of a measurement system that is external to a lithographic apparatus is an inspection apparatus or a metrology apparatus, which may be used to determine properties of a pattern previously projected onto a substrate by the lithographic apparatus. Such an external inspection apparatus may, for example, comprise a scatterometer. Examples of measurement systems that may be provided within a lithographic apparatus include: a topography measurement system (also known as a level sensor); a position measurement system (for example an interferometric device) for determining position of a reticle or wafer stage; and an alignment sensor for determining a position of an alignment mark. These measurement devices may use electromagnetic radiation to perform the measurement.

Different types of radiation may be used to interrogate different types of properties of a pattern. Some measurements system may use a broadband radiation source. Such a broadband radiation source may be a supercontinuum source and may comprise an optical fiber having a non-linear medium through which a pulsed pump radiation beam is propagated to broaden a spectrum of the radiation.

The use of optical fibers for broadening of the spectrum however typically poses challenges in relation to their relative fragility and susceptibility to stress built up at locations where the fiber is fixated.

It may be desirable to provide an alternative for optical fibers in apparatuses for broadening a frequency range of pump radiation that at least partially addresses said one or more problems.

SUMMARY

It is an objective of the invention to provide an optical element configured for generating broadband radiation upon receiving pump radiation which is less fragile and less prone to develop locally induced stress.

According to a first aspect of the present invention there is provided monolithic optical element for generating broadband radiation upon receiving input radiation at an input end of the optical element, the optical element comprising: a hollow core region for guiding the input radiation along a longitudinal axis of the optical element towards and output end of the optical element; a cladding region surrounding the hollow core region along the longitudinal axis and comprising transversally arranged micro-structures configured to provide non-linear optical behaviour to the optical element causing the generation of the broadband radiation; and a supporting region surrounding the cladding region along the longitudinal axis of at least part of the optical element, characterized in that the supporting region has a transversal dimension sufficiently large to render said at least part of the optical element substantially rigid, and wherein the supporting region surrounds at least a further hollow core region and a further cladding region surrounding said further hollow core region.

The optical element of the first aspect is substantially rigid and hence less fragile and susceptible to stress induced behavior compared to an optical fiber. Further the optical element of the first aspect comprises multiple broadband generating regions which are enclosed in a supporting region, hence typically the significantly larger diameter of such an optical element compared to a single optical fiber renders the optical element less fragile and susceptible to stress induced behavior compared to an optical fiber.

Further aspects of the invention disclosed in this document relate to intermediate products and methods of manufacturing associated with the optical element of the first and the second aspect.

The following may apply to all aspects of the present invention.

It will be appreciated that, as used herein, the cladding region is intended to mean a region of the monolithic optical element for guiding radiation propagating through the hollow core region of the monolithic optical element (i.e. confining said radiation within the hollow core region).

Typically the micro-structures comprised within the cladding region are arranged as capillaries extending along the longitudinal axis of the monolithic optical element.

Hollow core-facing wall portions of the plurality of capillaries may act as anti-resonant elements. It will be appreciated that an anti-resonant element is intended to mean an element which is arranged to confine radiation within the hollow core predominantly by anti-resonance. Optical fibers comprising anti-resonant elements or structures are known in the art as anti-resonant fibers, tubular fibers, single-ring fibers, negative curvature fibers or inhibited coupling fibers. Various different designs of such fibers are known in the art. In particular, the term anti-resonance element is not intended to encompass elements that arranged to confine radiation within the hollow core predominantly by creating a photonic bandgap in the cladding region (such as, for example, Kagome photonic crystal fibers).

In general, each capillary wall portion at least partially defines the hollow core and separates the hollow core from a cavity. For example, each capillary may comprise a cavity that is separated from the hollow core by a wall. It will be appreciated that the wall portion may act as an anti-resonant Fabry-Perot resonator for radiation that propagates through the hollow core (and may be incident on the wall at a grazing incidence angle). The thickness of the wall portion may be suitable so as to ensure that reflection back into the hollow core is generally enhanced whereas transmission into the cavity is generally suppressed.

The monolithic optical element according to the present invention may be suitable for use in an apparatus for receiving input radiation and broadening a frequency range of the input radiation so as to provide output radiation. Optical elements which guide radiation using anti-resonance elements can have a broader transmission window (i.e. having a larger transmission bandwidth) than photonic bandgap based elements (typically fibers). Advantageously, such optical elements may therefore be better suited for use in an apparatus for receiving input radiation and broadening a frequency range of the input radiation so as to provide output radiation (for example a supercontinuum source).

Additionally or alternatively, the monolithic optical element according to the present invention may be suitable for beam delivery applications (without broadening the frequency range of the radiation).

The monolithic optical element according to the present invention may be suitable for use in delivering light to a sensor.

The supporting region typically supports the cladding region(s) of the monolithic optical element. The monolithic optical element according to the present invention has a thicker supporting region relative to the diameter of a jacket region of a hollow core fiber, such as known HC-PCFs. The thicker supporting region of the present invention advantageously provides an optical element with improved strength (for example increased tensile strength), and less prone to breaking, over the prior art. Furthermore, prior art HC-PCFs can suffer from impaired performance in applications due to stress caused by non-optimal mounting of the fiber. Monolithic optical elements with thicker supporting regions according to the present invention may therefore also advantageously exhibit superior performance when optomechanically integrated in an apparatus, for example for applications as described above.

In some embodiments of the present invention, an outer diameter of the monolithic optical element is greater than 500 μm.

In some embodiments of the present invention, the diameter of the hollow core region is between 5 μm and 60 μm.

In some embodiments of the present invention, the wall portions of the capillaries have a thickness smaller than 400 nm.

In some embodiments of the present invention, the wall portions of the capillaries have a thickness smaller than 300 nm.

In some embodiments of the present invention, the wall portions of the capillaries have a thickness smaller than 150 nm.

In some embodiments of the present invention, the cladding region comprises a hexagonal cross-section.

A hexagonal cross-section may advantageously facilitate placement of the capillaries in a symmetrical or substantially symmetrical arrangement during fabrication of the monolithic optical element.

In some embodiments, the cladding region comprises six capillaries, wherein each of the capillaries is located at a vertex of the hexagonal cross-section of the cladding region.

A hexagonal arrangement of capillaries at the vertices of the hexagonal cross-section advantageously enables a simplified process of fabricating the monolithic optical element.

In some embodiments, the cladding region comprises a circular cross-section.

In some embodiments, the capillaries surround the hollow core region in a symmetrical arrangement.

A symmetrical arrangement of capillaries may advantageously enable improved suppression of higher order modes in the monolithic optical element.

BRIEF DESCRIPTION OF THE DRAWINGS

Embodiments of the invention will now be described, by way of example only, with reference to the accompanying schematic drawings, in which.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

Reticle

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
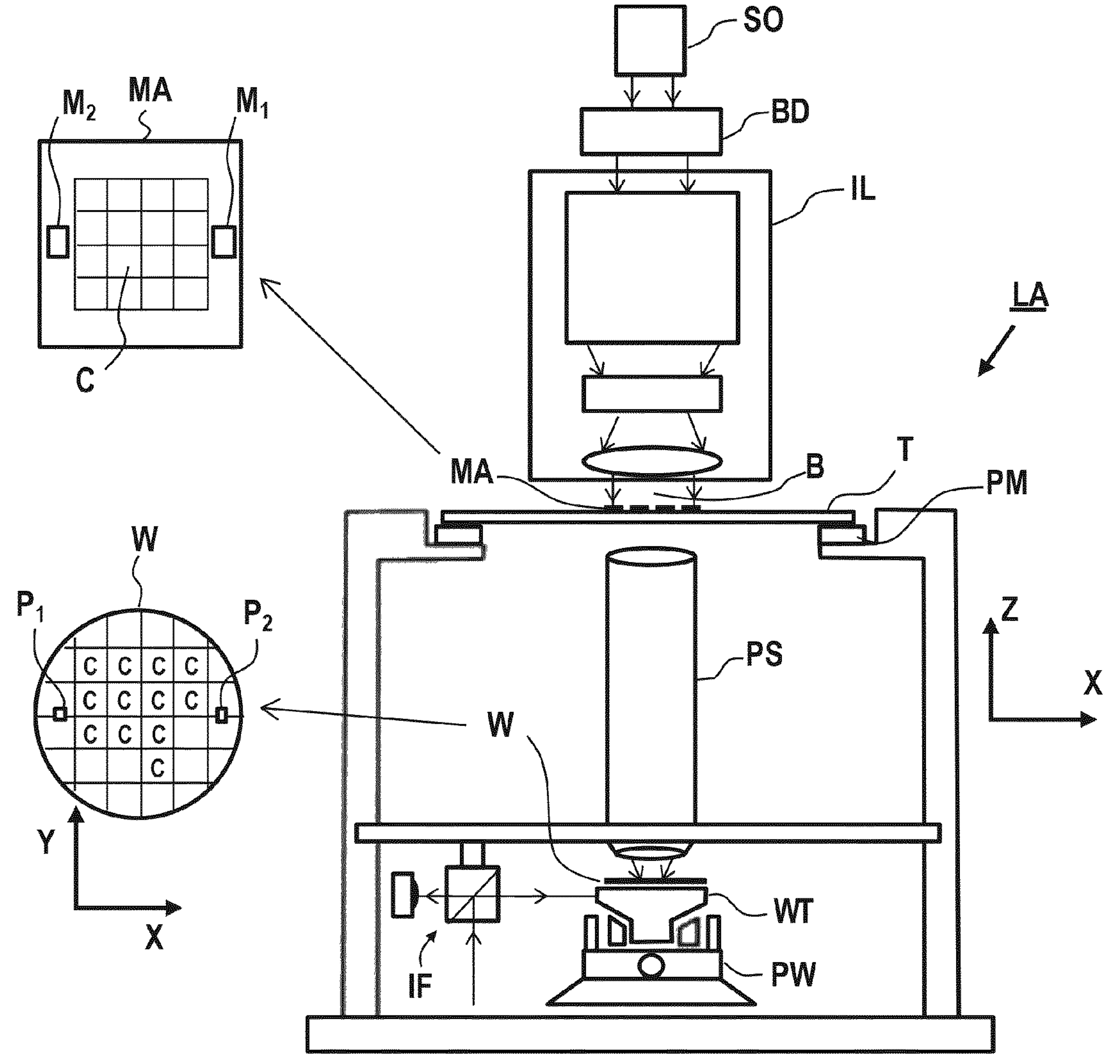
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
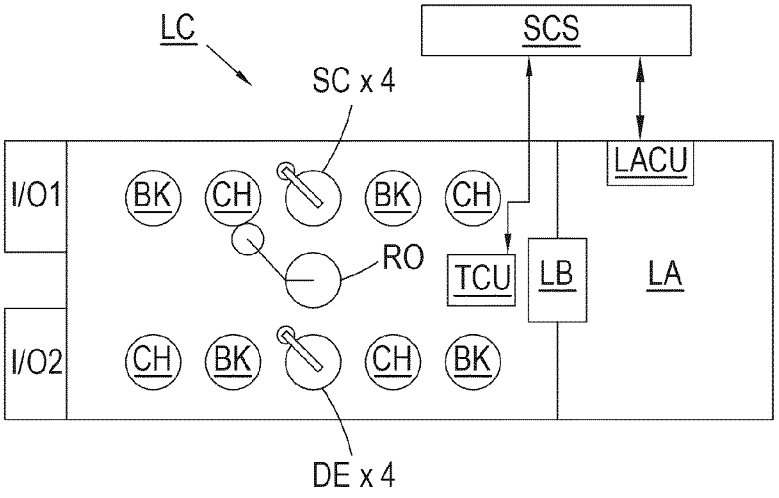
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
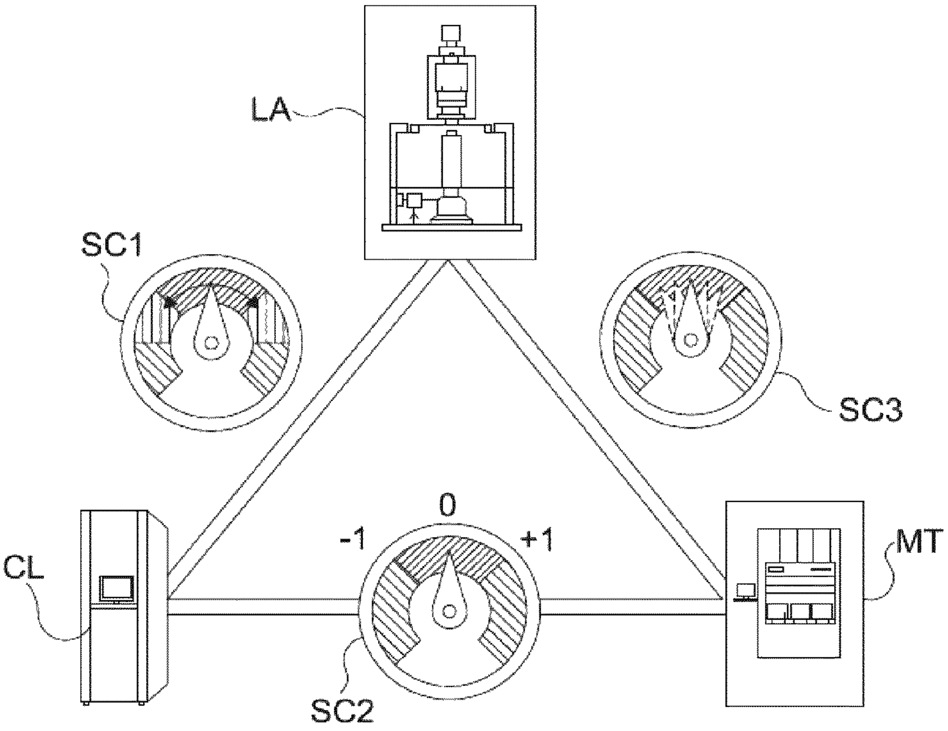
FIG. 3 depicts a schematic representation of holistic lithography, representing a cooperation between three key technologies to optimize semiconductor manufacturing.

Typically the patterning process in a lithographic apparatus LA is one of the most critical steps in the processing which requires high accuracy of dimensioning and placement of structures on the substrate W. To ensure this high accuracy, three systems may be combined in a so called “holistic” control environment as schematically depicted in FIG. 3. One of these systems is the lithographic apparatus LA which is (virtually) connected to a metrology tool MT (a second system) and to a computer system CL (a third system). The key of such “holistic” environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing “0” in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3). Different types of metrology tools MT for measuring one or more properties relating to a lithographic apparatus and/or a substrate to be patterned will now be described.

In lithographic processes, it is desirable to make frequently measurements of the structures created, e.g., for process control and verification. Tools to make such measurement are typically called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers may measure gratings using light from soft x-ray and visible to near-IR wavelength range.

In a first embodiment, the scatterometer MT is an angular resolved scatterometer. In such a scatterometer reconstruction methods may be applied to the measured signal to reconstruct or calculate properties of the grating. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In a second embodiment, the scatterometer MT is a spectroscopic scatterometer MT. In such spectroscopic scatterometer MT, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the scatterometer MT is a ellipsometric scatterometer. The ellipsometric scatterometer allows for determining parameters of a lithographic process by measuring scattered radiation for each polarization state. Such metrology apparatus emits polarized light (such as linear, circular, or elliptic) by using, for example, appropriate polarization filters in the illumination section of the metrology apparatus. A source suitable for the metrology apparatus may provide polarized radiation as well. Various embodiments of existing ellipsometric scatterometers are described in U.S. patent application Ser. Nos. 11/451,599, 11/708,678, 12/256,780, 12/486,449, 12/920,968, 12/922,587, 13/000,229, 13/033,135, 13/533,110 and 13/891,410 incorporated herein by reference in their entirety.

In one embodiment of the scatterometer MT, the scatterometer MT is adapted to measure the overlay of two misaligned gratings or periodic structures by measuring asymmetry in the reflected spectrum and/or the detection configuration, the asymmetry being related to the extent of the overlay. The two (typically overlapping) grating structures may be applied in two different layers (not necessarily consecutive layers), and may be formed substantially at the same position on the wafer. The scatterometer may have a symmetrical detection configuration as described e.g. in co-owned patent application EP1,628,164A, such that any asymmetry is clearly distinguishable. This provides a straightforward way to measure misalignment in gratings. Further examples for measuring overlay error between the two layers containing periodic structures as target is measured through asymmetry of the periodic structures may be found in PCT patent application publication no. WO 2011/012624 or US patent application US 20160161863, incorporated herein by reference in its entirety.

Other parameters of interest may be focus and dose. Focus and dose may be determined simultaneously by scatterometry (or alternatively by scanning electron microscopy) as described in US patent application US2011-0249244, incorporated herein by reference in its entirety. A single structure may be used which has a unique combination of critical dimension and sidewall angle measurements for each point in a focus energy matrix (FEM—also referred to as Focus Exposure Matrix). If these unique combinations of critical dimension and sidewall angle are available, the focus and dose values may be uniquely determined from these measurements.

A metrology target may be an ensemble of composite gratings, formed by a lithographic process, mostly in resist, but also after etch process for example. Typically the pitch and line-width of the structures in the gratings strongly depend on the measurement optics (in particular the NA of the optics) to be able to capture diffraction orders coming from the metrology targets. As indicated earlier, the diffracted signal may be used to determine shifts between two layers (also referred to 'overlay') or may be used to reconstruct at least part of the original grating as produced by the lithographic process. This reconstruction may be used to provide guidance of the quality of the lithographic process and may be used to control at least part of the lithographic process. Targets may have smaller sub-segmentation which are configured to mimic dimensions of the functional part of the design layout in a target. Due to this sub-segmentation, the targets will behave more similar to the functional part of the design layout such that the overall process parameter measurements resembles the functional part of the design layout better. The targets may be measured in an underfilled mode or in an overfilled mode. In the underfilled mode, the measurement beam generates a spot that is smaller than the overall target. In the overfilled mode, the measurement beam generates a spot that is larger than the overall target. In such overfilled mode, it may also be possible to measure different targets simultaneously, thus determining different processing parameters at the same time.

Overall measurement quality of a lithographic parameter using a specific target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016-0161863 and published US patent application US 2016/0370717A1 incorporated herein by reference in its entirety.

Figure 4:
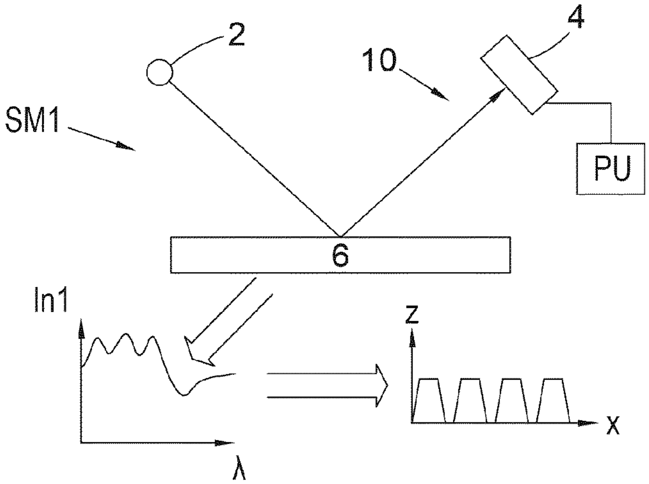
FIG. 4 depicts a schematic overview of a scatterometer metrology tool.

A metrology apparatus, such as a scatterometer SM1, is depicted in FIG. 4. It comprises a broadband (white light) radiation projector 2 which projects radiation onto a substrate 6. The reflected or scattered radiation is passed to a spectrometer detector 4, which measures a spectrum 10 (i.e. a measurement of intensity In1 as a function of wavelength λ) of the specular reflected radiation. From this data, the structure or profile giving rise to the detected spectrum may be reconstructed by processing unit PU, e.g. by Rigorous Coupled Wave Analysis and non-linear regression or by comparison with a library of simulated spectra as shown at the bottom of FIG. 4. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

In lithographic processes, it is desirable to make frequently measurements of the structures created, e.g., for process control and verification. Various tools for making such measurements are known, including scanning electron microscopes or various forms of metrology apparatuses, such as scatterometers. Examples of known scatterometers often rely on provision of dedicated metrology targets, such as underfilled targets (a target, in the form of a simple grating or overlapping gratings in different layers, that is large enough that a measurement beam generates a spot that is smaller than the grating) or overfilled targets (whereby the illumination spot partially or completely contains the target). Further, the use of metrology tools, for example an angular resolved scatterometer illuminating an underfilled target, such as a grating, allows the use of so-called reconstruction methods where the properties of the grating can be calculated by simulating interaction of scattered radiation with a mathematical model of the target structure and comparing the simulation results with those of a measurement. Parameters of the model are adjusted until the simulated interaction produces a diffraction pattern similar to that observed from the real target.

Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers can measure in one image multiple targets from multiple gratings using light from soft x-ray and visible to near-IR wave range.

A topography measurement system, level sensor or height sensor, and which may be integrated in the lithographic apparatus, is arranged to measure a topography of a top surface of a substrate (or wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

Figure 5:
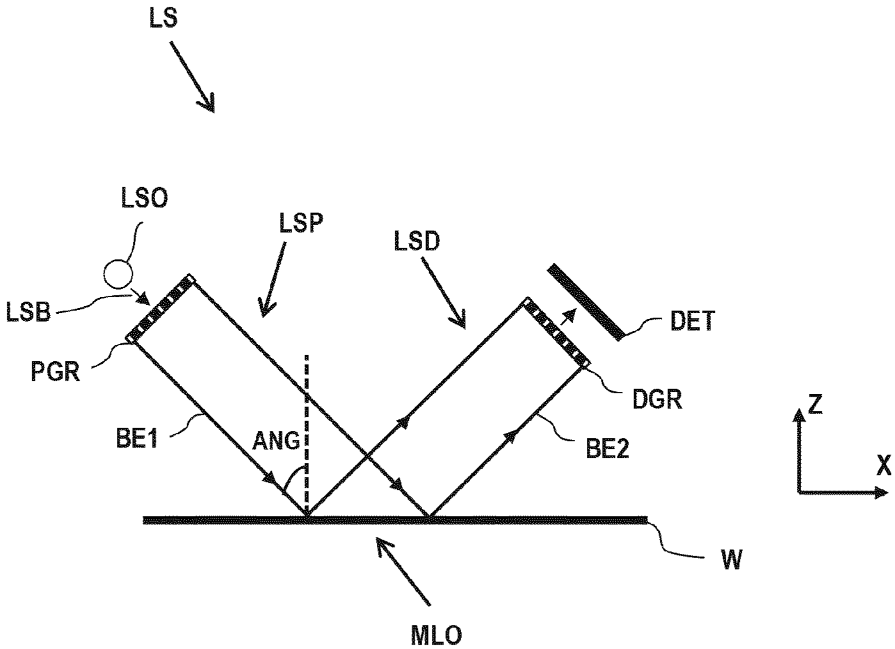
FIG. 5 depicts a schematic overview of a level sensor metrology tool.

An example of a level or height sensor LS as known in the art is schematically shown in FIG. 5, which illustrates only the principles of operation. In this example, the level sensor comprises an optical system, which includes a projection unit LSP and a detection unit LSD. The projection unit LSP comprises a radiation source LSO providing a beam of radiation LSB which is imparted by a projection grating PGR of the projection unit LSP. The radiation source LSO may be, for example, a narrowband or broadband radiation source, such as a supercontinuum light source, polarized or non-polarized, pulsed or continuous, such as a polarized or non-polarized laser beam. The radiation source LSO may include a plurality of radiation sources having different colors, or wavelength ranges, such as a plurality of LEDs. The radiation source LSO of the level sensor LS is not restricted to visible radiation, but may additionally or alternatively encompass UV and/or IR radiation and any range of wavelengths suitable to reflect from a surface of a substrate.

The projection grating PGR is a periodic grating comprising a periodic structure resulting in a beam of radiation BE1 having a periodically varying intensity. The beam of radiation BE1 with the periodically varying intensity is directed towards a measurement location MLO on a substrate W having an angle of incidence ANG with respect to an axis perpendicular (Z-axis) to the incident substrate surface between 0 degrees and 90 degrees, typically between 70 degrees and 80 degrees. At the measurement location MLO, the patterned beam of radiation BE1 is reflected by the substrate W (indicated by arrows BE2) and directed towards the detection unit LSD.

In order to determine the height level at the measurement location MLO, the level sensor further comprises a detection system comprising a detection grating DGR, a detector DET and a processing unit (not shown) for processing an output signal of the detector DET. The detection grating DGR may be identical to the projection grating PGR. The detector DET produces a detector output signal indicative of the light received, for example indicative of the intensity of the light received, such as a photodetector, or representative of a spatial distribution of the intensity received, such as a camera. The detector DET may comprise any combination of one or more detector types.

By means of triangulation techniques, the height level at the measurement location MLO can be determined. The detected height level is typically related to the signal strength as measured by the detector DET, the signal strength having a periodicity that depends, amongst others, on the design of the projection grating PGR and the (oblique) angle of incidence ANG.

The projection unit LSP and/or the detection unit LSD may include further optical elements, such as lenses and/or mirrors, along the path of the patterned beam of radiation between the projection grating PGR and the detection grating DGR (not shown).

In an embodiment, the detection grating DGR may be omitted, and the detector DET may be placed at the position where the detection grating DGR is located. Such a configuration provides a more direct detection of the image of the projection grating PGR.

In order to cover the surface of the substrate W effectively, a level sensor LS may be configured to project an array of measurement beams BE1 onto the surface of the substrate W, thereby generating an array of measurement areas MLO or spots covering a larger measurement range.

Various height sensors of a general type are disclosed for example in U.S. Pat. Nos. 7,265,364 and 7,646,471, both incorporated by reference. A height sensor using UV radiation instead of visible or infrared radiation is disclosed in US2010233600A1, incorporated by reference. In WO2016102127A1, incorporated by reference, a compact height sensor is described which uses a multi-element detector to detect and recognize the position of a grating image, without needing a detection grating.

The position measurement system PMS may comprise any type of sensor that is suitable to determine a position of the substrate support WT. The position measurement system PMS may comprise any type of sensor that is suitable to determine a position of the mask support MT. The sensor may be an optical sensor such as an interferometer or an encoder. The position measurement system PMS may comprise a combined system of an interferometer and an encoder. The sensor may be another type of sensor, such as a magnetic sensor. a capacitive sensor or an inductive sensor. The position measurement system PMS may determine the position relative to a reference, for example the metrology frame MF or the projection system PS. The position measurement system PMS may determine the position of the substrate table WT and/or the mask support MT by measuring the position or by measuring a time derivative of the position, such as velocity or acceleration.

The position measurement system PMS may comprise an encoder system. An encoder system is known from for example, United States patent application US2007/0058173A1, filed on Sep. 7, 2006, hereby incorporated by reference. The encoder system comprises an encoder head, a grating and a sensor. The encoder system may receive a primary radiation beam and a secondary radiation beam. Both the primary radiation beam as well as the secondary radiation beam originate from the same radiation beam, i.e., the original radiation beam. At least one of the primary radiation beam and the secondary radiation beam is created by diffracting the original radiation beam with the grating. If both the primary radiation beam and the secondary radiation beam are created by diffracting the original radiation beam with the grating, the primary radiation beam needs to have a different diffraction order than the secondary radiation beam. Different diffraction orders are, for example, +1st order, −1st order, +2nd order and −2nd order. The encoder system optically combines the primary radiation beam and the secondary radiation beam into a combined radiation beam. A sensor in the encoder head determines a phase or phase difference of the combined radiation beam. The sensor generates a signal based on the phase or phase difference. The signal is representative of a position of the encoder head relative to the grating. One of the encoder head and the grating may be arranged on the substrate structure WT. The other of the encoder head and the grating may be arranged on the metrology frame MF or the base frame BF. For example, a plurality of encoder heads are arranged on the metrology frame MF, whereas a grating is arranged on a top surface of the substrate support WT. In another example, a grating is arranged on a bottom surface of the substrate support WT, and an encoder head is arranged below the substrate support WT.

The position measurement system PMS may comprise an interferometer system. An interferometer system is known from, for example, U.S. Pat. No. 6,020,964, filed on Jul. 13, 1998, hereby incorporated by reference. The interferometer system may comprise a beam splitter, a mirror, a reference mirror and a sensor. A beam of radiation is split by the beam splitter into a reference beam and a measurement beam. The measurement beam propagates to the mirror and is reflected by the mirror back to the beam splitter. The reference beam propagates to the reference mirror and is reflected by the reference mirror back to the beam splitter. At the beam splitter, the measurement beam and the reference beam are combined into a combined radiation beam. The combined radiation beam is incident on the sensor. The sensor determines a phase or a frequency of the combined radiation beam. The sensor generates a signal based on the phase or the frequency. The signal is representative of a displacement of the mirror. In an embodiment, the mirror is connected to the substrate support WT. The reference mirror may be connected to the metrology frame MF. In an embodiment, the measurement beam and the reference beam are combined into a combined radiation beam by an additional optical component instead of the beam splitter.

In the manufacture of complex devices, typically many lithographic patterning steps are performed, thereby forming functional features in successive layers on the substrate. A critical aspect of performance of the lithographic apparatus is therefore the ability to place the applied pattern correctly and accurately in relation to features laid down in previous layers (by the same apparatus or a different lithographic apparatus). For this purpose, the substrate is provided with one or more sets of marks. Each mark is a structure whose position can be measured at a later time using a position sensor, typically an optical position sensor. The position sensor may be referred to as "alignment sensor" and marks may be referred to as "alignment marks". A mark may also be referred to as a metrology target.

A lithographic apparatus may include one or more (e.g. a plurality of) alignment sensors by which positions of alignment marks provided on a substrate can be measured accurately. Alignment (or position) sensors may use optical phenomena such as diffraction and interference to obtain position information from alignment marks formed on the substrate. An example of an alignment sensor used in current lithographic apparatus is based on a self-referencing interferometer as described in U.S. Pat. No. 6,961,116. Various enhancements and modifications of the position sensor have been developed, for example as disclosed in US2015261097A1. The contents of all of these publications are incorporated herein by reference.

A mark, or alignment mark, may comprise a series of bars formed on or in a layer provided on the substrate or formed (directly) in the substrate. The bars may be regularly spaced and act as grating lines so that the mark can be regarded as a diffraction grating with a well-known spatial period (pitch). Depending on the orientation of these grating lines, a mark may be designed to allow measurement of a position along the X axis, or along the Y axis (which is oriented substantially perpendicular to the X axis). A mark comprising bars that are arranged at +45 degrees and/or −45 degrees with respect to both the X- and Y-axes allows for a combined X- and Y-measurement using techniques as described in US2009/195768A, which is incorporated by reference.

The alignment sensor scans each mark optically with a spot of radiation to obtain a periodically varying signal, such as a sine wave. The phase of this signal is analyzed, to determine the position of the mark and, hence, of the substrate relative to the alignment sensor, which, in turn, is fixated relative to a reference frame of a lithographic apparatus. So-called coarse and fine marks may be provided, related to different (coarse and fine) mark dimensions, so that the alignment sensor can distinguish between different cycles of the periodic signal, as well as the exact position (phase) within a cycle. Marks of different pitches may also be used for this purpose.

Measuring the position of the marks may also provide information on a deformation of the substrate on which the marks are provided, for example in the form of a wafer grid. Deformation of the substrate may occur by, for example, electrostatic clamping of the substrate to the substrate table and/or heating of the substrate when the substrate is exposed to radiation.

Figure 6:
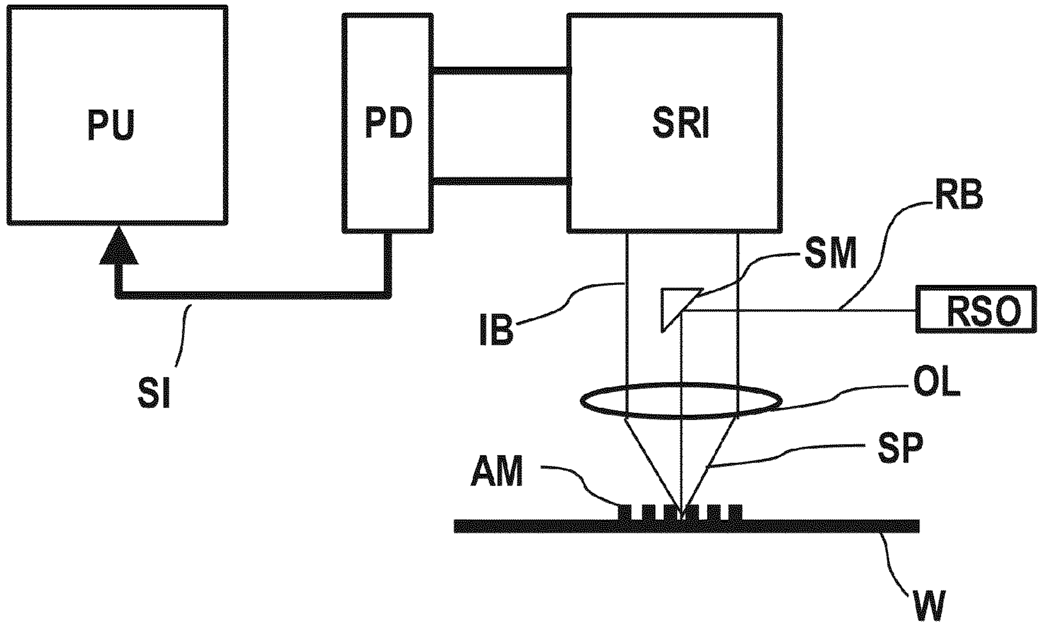
FIG. 6 depicts a schematic overview of an alignment sensor metrology tool.

FIG. 6 is a schematic block diagram of an embodiment of a known alignment sensor AS, such as is described, for example, in U.S. Pat. No. 6,961,116, and which is incorporated by reference. Radiation source RSO provides a beam RB of radiation of one or more wavelengths, which is diverted by diverting optics onto a mark, such as mark AM located on substrate W, as an illumination spot SP. In this example the diverting optics comprises a spot mirror SM and an objective lens OL. The illumination spot SP, by which the mark AM is illuminated, may be slightly smaller in diameter than the width of the mark itself.

Radiation diffracted by the mark AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116 mentioned above, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

The diverting optics, which in this example comprises the spot mirror SM, may also serve to block zero order radiation reflected from the mark, so that the information-carrying beam IB comprises only higher order diffracted radiation from the mark AM (this is not essential to the measurement, but improves signal to noise ratios).

Intensity signals SI are supplied to a processing unit PU. By a combination of optical processing in the block SRI and computational processing in the unit PU, values for X- and Y-position on the substrate relative to a reference frame are output.

A single measurement of the type illustrated only fixes the position of the mark within a certain range corresponding to one pitch of the mark. Coarser measurement techniques are used in conjunction with this to identify which period of a sine wave is the one containing the marked position. The same process at coarser and/or finer levels may be repeated at different wavelengths for increased accuracy and/or for robust detection of the mark irrespective of the materials from which the mark is made, and materials on and/or below which the mark is provided. The wavelengths may be multiplexed and de-multiplexed optically so as to be processed simultaneously, and/or they may be multiplexed by time division or frequency division.

In this example, the alignment sensor and spot SP remain stationary, while it is the substrate W that moves. The alignment sensor can thus be mounted rigidly and accurately to a reference frame, while effectively scanning the mark AM in a direction opposite to the direction of movement of substrate W. The substrate W is controlled in this movement by its mounting on a substrate support and a substrate positioning system controlling the movement of the substrate support. A substrate support position sensor (e.g. an interferometer) measures the position of the substrate support (not shown). In an embodiment, one or more (alignment) marks are provided on the substrate support. A measurement of the position of the marks provided on the substrate support allows the position of the substrate support as determined by the position sensor to be calibrated (e.g. relative to a frame to which the alignment system is connected). A measurement of the position of the alignment marks provided on the substrate allows the position of the substrate relative to the substrate support to be determined.

Metrology tools MT, such as a scatterometer, topography measurement system, or position measurement system mentioned above may use radiation originating from a radiation source to perform a measurement. The properties of the radiation used by a metrology tool may affect the type and quality of measurements that may be performed. For some applications, it may be advantageous to use multiple radiation frequencies to measure a substrate, for example broadband radiation may be used. Multiple different frequencies may be able to propagate, irradiate, and scatter off a metrology target with no or minimal interference with other frequencies. Therefore different frequencies may for example be used to obtain more metrology data simultaneously. Different radiation frequencies may also be able to interrogate and discover different properties of a metrology target. Broadband radiation may be useful in metrology systems MT such as for example level sensors, alignment mark measurement systems, scatterometry tools, or inspection tools. A broadband radiation source may be a supercontinuum source.

High quality broadband radiation, for example supercontinuum radiation, may be difficult to generate. One method for generating broadband radiation may be to broaden high-power narrow band or single frequency input radiation, for example making use of non-linear, higher order effects. The input radiation (which may be produced using a laser) may be referred to as pump radiation. To obtain high power radiation for broadening effects, radiation may be confined into a small area so that strongly localised high intensity radiation is achieved. In those areas, the radiation may interact with broadening structures and/or materials forming a non-linear medium so as to create broadband output radiation. In the high intensity radiation areas, different materials and/or structures may be used to enable and/or improve radiation broadening by providing a suitable non-linear medium.

In some implementations, as discussed further below with reference to FIGS. 9 to 11, methods and apparatus for broadening input radiation may use a fiber for confining input radiation, and for broadening the input radiation to output broadband radiation. The fiber may be a hollow core fiber, and may comprise internal structures to achieve effective guiding and confinement of radiation in the fiber. The fiber may be a hollow core photonic crystal fiber (HC-PCF), which is particularly suitable for strong radiation confinement, predominantly inside the hollow core of the fiber, achieving high radiation intensities. The hollow core of the fiber may be filled with a gas acting as a broadening medium for broadening input radiation. Such a fiber and gas arrangement may be used to create a supercontinuum radiation source. Radiation input to the fiber may be electromagnetic radiation, for example radiation in one or more of the infrared, visible, UV, and extreme UV spectra. The output radiation may consist of or comprise broadband radiation, which may be referred to herein as white light.

In particular, the optical fiber may be a hollow-core, photonic crystal fiber of a type comprising anti-resonant structures for confinement of radiation. Such fibers comprising anti-resonant structures are known in the art as anti-resonant fibers, tubular fibers, single-ring fibers, negative curvature fibers or inhibited coupling fibers. Various different designs of such fibers are known in the art.

It will be appreciated that an anti-resonance element is intended to mean an element which is arranged to confine radiation within the hollow core predominantly by anti-resonance. In particular, the term anti-resonance element is not intended to encompass elements that are arranged to confine radiation within the hollow core by predominantly creating a photonic bandgap in the cladding portion (such as, for example, Kagome photonic crystal fibers). Pure photonic bandgap fibers offer very low loss over a very limited bandwidth. Optical fibers which guide radiation using anti-resonance elements can have a broader transmission window (i.e. having a larger transmission bandwidth) than photonic bandgap fibers. Advantageously, such fibers may therefore be better suited for use in an apparatus for receiving input radiation and broadening a frequency range of the input radiation so as to provide output radiation (for example a supercontinuum source).

Figure 7:
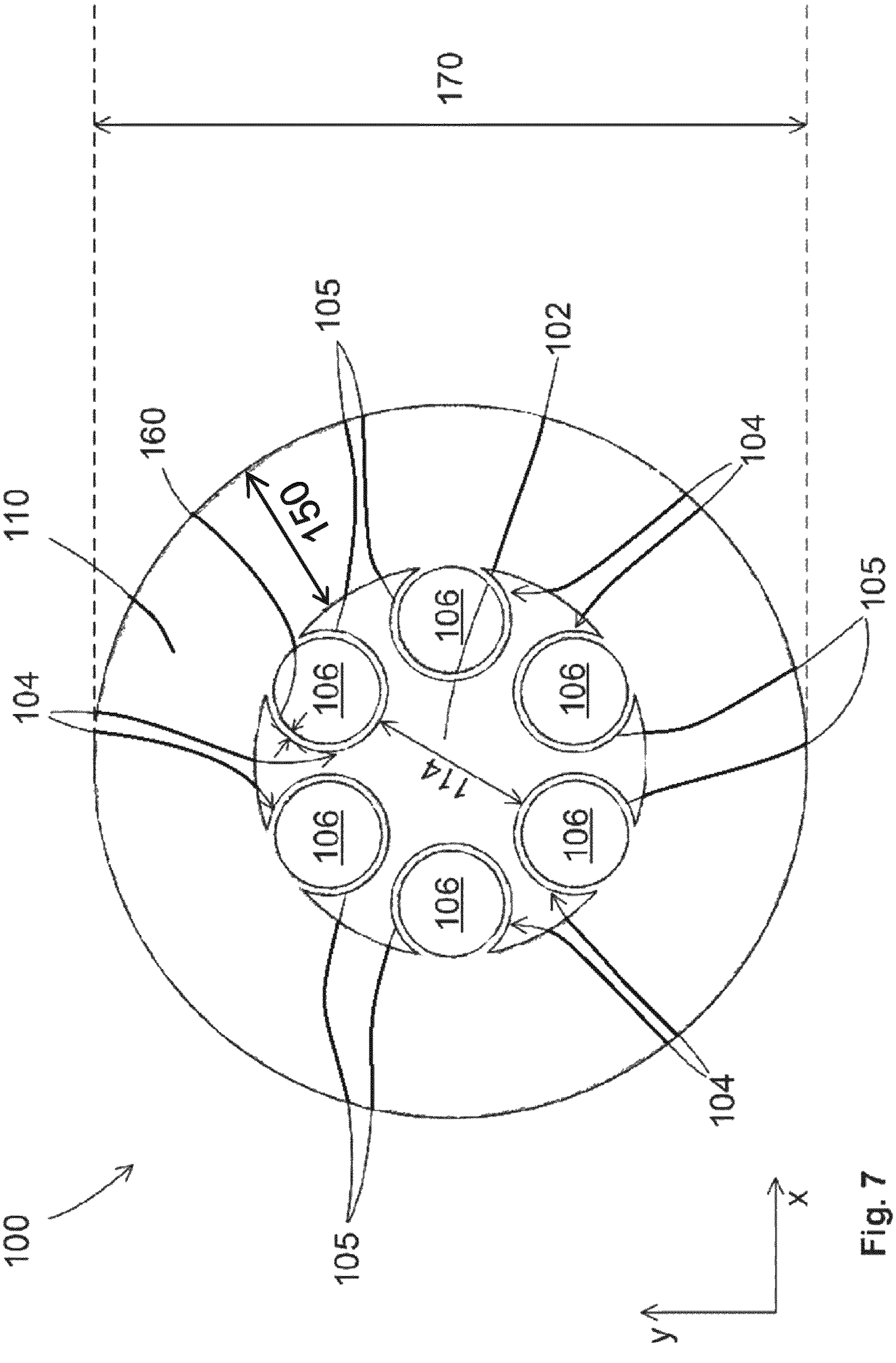
FIG. 7 is a schematic cross sectional view of an optical fiber according to the state of the art in a transverse plane (i.e. perpendicular to an axis of the optical fiber)
Figure 8:
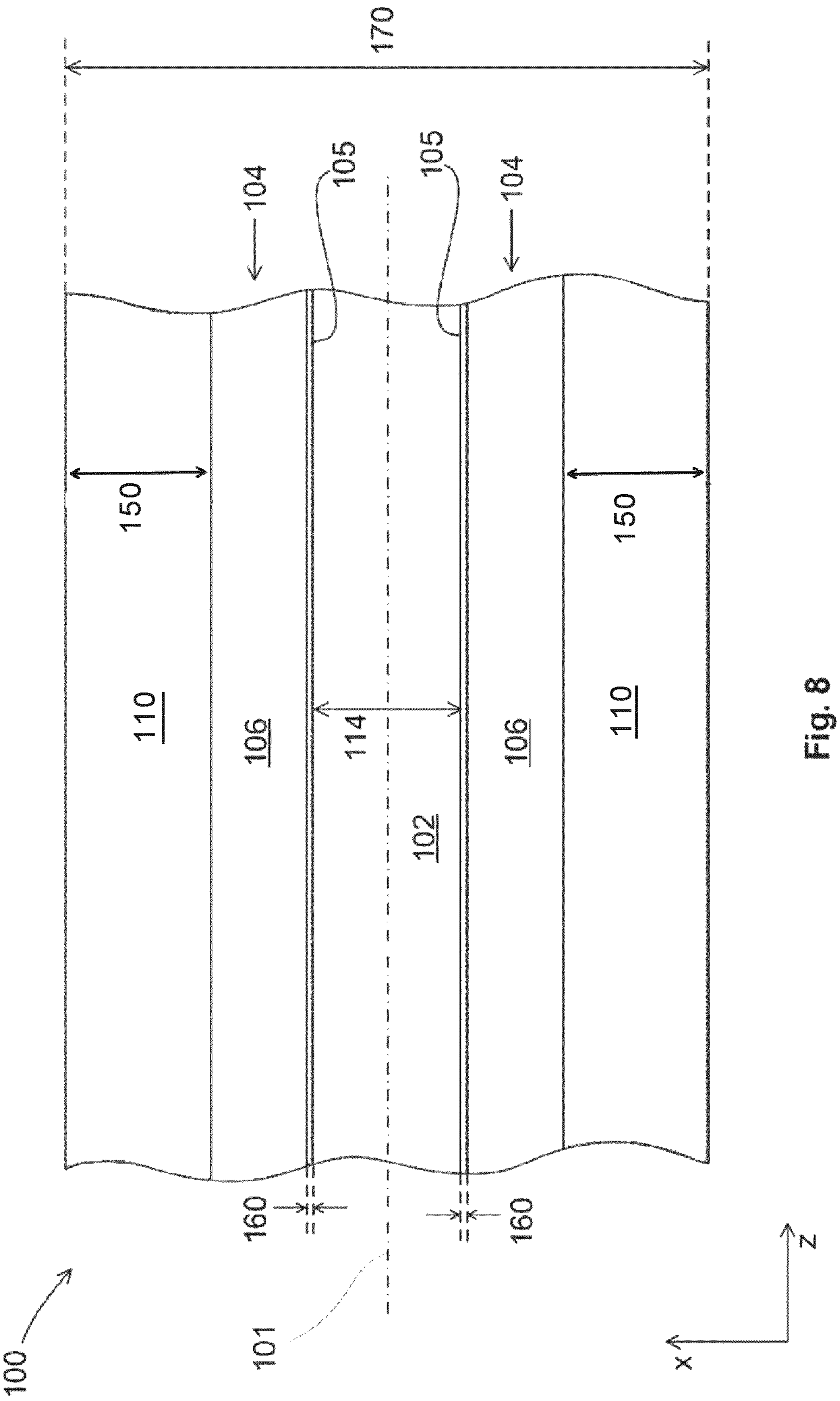
FIG. 8 is a schematic cross sectional view of the optical fiber shown in FIG. 7 in a plane containing the axis of the optical fiber.

Example designs of such optical fibers are now described with reference to FIGS. 7 and 8. FIGS. 7 and 8 are schematic cross sectional views of an optical fiber 100 in two mutually perpendicular planes.

The optical fiber 100 comprises an elongate body, which is longer in one dimension compared to the other two dimensions of the fiber 100. This longer dimension may be referred to as an axial direction and may define an axis 101 of the optical fiber 100. The two other dimensions define a plane which may be referred to as a transverse plane. FIG. 7 shows a cross-section of the optical fiber 100 in the transverse plane (i.e. perpendicular to the axis 101), which is labelled as the x-y plane. FIG. 8 shows a cross-section of the optical fiber 100 in a plane containing the axis 101, in particular the x-z plane. The transverse cross-section of the optical fiber 100 may be substantially constant along the fiber axis 101.

It will be appreciated that the optical fiber 100 has some degree of flexibility and therefore the direction of the axis 101 will not, in general, be uniform along the length of the optical fiber 100. The terms such as the optical axis 101, the transverse cross-section and the like will be understood to mean the local optical axis 101, the local transverse cross-section and so on. Furthermore, where components are described as being cylindrical or tubular these terms will be understood to encompass such shapes that may have been distorted as the optical fiber 100 is flexed.

The optical fiber 100 may have any length and it will be appreciated that the length of the optical fiber 100 may be dependent on the application (for example the amount of spectral broadening that is desired in applications within a supercontinuum radiation source). The optical fiber 100 may have a length between 1 cm and 10 m, for example, the optical fiber 100 may have a length between 10 cm and 100 cm.

The optical fiber 100 comprises: a hollow core 102; an inner cladding region surrounding the hollow core 102; and a jacket region 110 surrounding and supporting the inner cladding region. The inner cladding region comprises a plurality of anti-resonance elements for guiding radiation through the hollow core 102. In particular, the plurality of anti-resonance elements are arranged to confine radiation that propagates through the optical fiber 100 predominantly inside the hollow core 102 and to guide the radiation along the optical fiber 100. The hollow core 102 of the optical fiber 100 may be disposed substantially in a central region of the optical fiber 100, so that the axis 101 of the optical fiber 100 may also define an axis of the hollow core 102 of the optical fiber 100.

The inner cladding region comprises a plurality of capillaries 104, for example tubular capillaries, surrounding the hollow core 102. In particular, in the example illustrated in FIGS. 7 and 8, the inner cladding region comprises a single ring of six tubular capillaries 104.

The capillaries 104 may also be referred to as tubes. The capillaries 104 may be circular in cross section, or may have another shape. Each capillary 104 comprises a generally cylindrical wall portion 105 that at least partially defines the hollow core 102 of the optical fiber 100 and separates the hollow core 102 from a cavity 106. Each of the hollow core-facing capillary wall portions 105 acts as an anti-resonant element for guiding radiation propagating through the optical fiber 100. It will be appreciated that the wall portion 105 may act as an anti-reflecting Fabry-Perot resonator for radiation that propagates through the hollow core 102 (and which may be incident on the wall portion 105 at a grazing incidence angle). A thickness 160 of the wall portion 105 may be suitable so as to ensure that reflection back into the hollow core 102 is generally enhanced whereas transmission into the cavity 106 is generally suppressed. In some embodiments, the capillary wall portion 105 may have a thickness 160 smaller than 400 nm; smaller than 300 nm; or smaller than 150 nm.

It will be appreciated that, as used herein, the term inner cladding region is intended to mean a region of the optical fiber 100 for guiding radiation propagating through the optical fiber 100 (i.e. the capillaries 104 which confine said radiation within the hollow core 102). The radiation may be confined in the form of transverse modes, propagating along the fiber axis 101.

The jacket region 110 is generally tubular and supports the capillaries 104 of the inner cladding region. The capillaries 104 are distributed evenly around an inner surface of the jacket region 110. The six capillaries 104 may be described as surrounding the hollow core 102 in a symmetrical arrangement. In embodiments comprising six capillaries 104, the capillaries 104 may be described as being disposed in a generally hexagonal formation.

The capillaries 104 are arranged so that each capillary is not in contact with any of the other capillaries 104. Each of the capillaries 104 is in contact with the jacket region 110 and spaced apart from adjacent capillaries 104 in a ring structure. Such an arrangement may be beneficial since it may increase a transmission bandwidth of the optical fiber 100 (relative, for example, to an arrangement wherein the capillaries are in contact with each other). Alternatively, in some embodiments, each of the capillaries 104 may be in contact adjacent capillaries 104 in the ring structure.

The six capillaries 104 of the inner cladding region are disposed in a ring structure around the hollow core 102. An inner surface of the ring structure of capillaries 104 at least partially defines the hollow core 102 of the optical fiber 100. In some embodiments, a diameter of the hollow core 102 (which may be defined as the smallest dimension between opposed capillaries, indicated by arrow 114) may be between 5 μm and 100 μm. In some embodiments, the diameter 114 of the hollow core 102 may be between 5 μm and 50 μm. In some embodiments, the diameter 114 of the hollow core 102 may be between 30 μm and 40 μm. The diameter 114 of the hollow core 102 may affect the mode field parameter, impact loss, dispersion, modal plurality, and non-linearity properties of the hollow core optical fiber 100.

In the embodiment illustrated in FIGS. 7 and 8, the inner cladding region comprises a single ring arrangement of capillaries 104 (the hollow core-facing wall portions 105 which act as anti-resonance elements). Therefore, a line in any radial direction from a center of the hollow core 102 to an exterior of the optical fiber 100 passes through no more than one capillary 104.

It will be appreciated that other embodiments may be provided with different arrangements of anti-resonance elements. These may include arrangements having multiple rings of anti-resonance elements and arrangements having nested anti-resonance elements. Furthermore, although the embodiment shown in FIGS. 7 and 8 comprises a ring of six capillaries 104 with wall portions 105, in other embodiments, one or more rings comprising any number of anti-resonance elements (for example 4, 5, 6, 7, 8, 9, 10, 11 or 12 capillaries) may be provided in the inner cladding region.

In the embodiment illustrated in FIGS. 7 and 8, the inner cladding region comprises a circular cross-section. However, it will be appreciated that other embodiments may be provided with inner cladding regions having cross-sections of shapes other than circular. For example, in an embodiment, the inner cladding region may have a hexagonal cross-section. A hexagonal cross-section may advantageously facilitate easier placement of the capillaries 104 in a symmetrical arrangement. For example, six capillaries 104 may be each placed at a vertex of the hexagonal cross-section, providing an arrangement of capillaries 104 having hexagonal symmetry.

The optical fiber 100 may be referred to as a hollow-core, photonic crystal fiber (HC-PCF). Typically, such a hollow-core, photonic crystal fiber comprises an inner cladding region (which may for example comprise anti-resonance elements) for guiding radiation within the fiber, and a jacket region. The jacket region is typically a jacket or tube of material which supports the inner cladding region.

Figure 12:
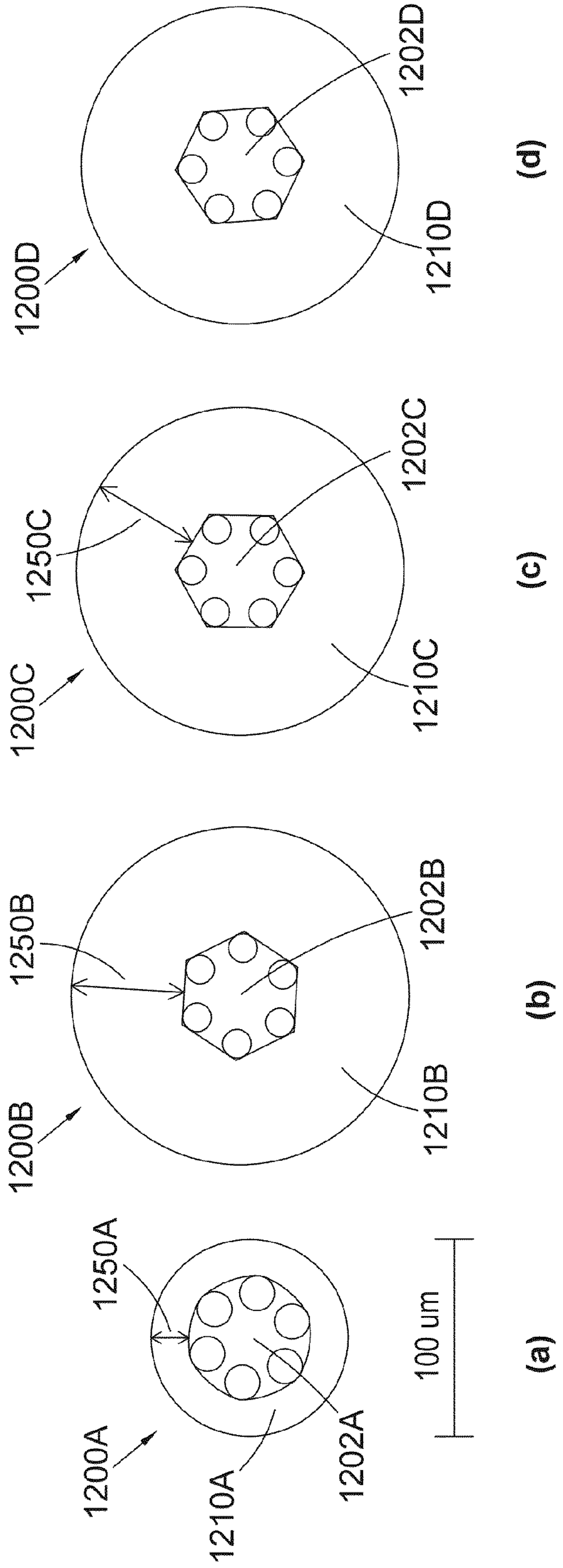
FIG. 12(*a*)-(*d*) depicts a hollow-core photonic crystal fiber according to the prior art.

FIG. 12(*a*)-(*d*) illustrates a cross-section of a HC-PCF 1200A. The HC-PCF 1200A comprises a hollow core 1202A, surrounded by an inner cladding region comprising six capillaries (visible as thin circles surrounding the hollow core 1202A in FIG. 12(*a*)). The inner cladding region is surrounded by a jacket region 1210A having a thickness 1250A. A scale bar showing 100 μm is also provided.

FIGS. 12(*b*)-(*d*) illustrate cross-sections of examples of HC-PCFs 1200B-D. The HC-PCFs 1200B-D of FIG. 12 may generally correspond to the optical fiber 100 illustrated in FIGS. 7 and 8. The example HC-PCFs 1200B-D each comprise a hollow core 1202B-D, surrounded by an inner cladding region comprising six capillaries (visible as thin circles surrounding the hollow cores 1202B-D in FIGS. 12(*a*)-(*d*)). Each example HC-PCF 1200B-D comprises a jacket region 1210B-D having a thickness 1250B-D. The hollow cores 1202B-D of example HC-PCFs 1200B-D may generally correspond to the hollow core 102, the capillaries surrounding the hollow core 102 may generally correspond to the capillaries 104, and the jacket regions 1210B-D may generally correspond to the jacket region 110, of optical fiber 100 illustrated in FIGS. 7 and 8. FIGS. 12(*b*)-(*d*) are shown to the same scale as FIG. 12(*a*).

The hollow core diameters, jacket thicknesses, outer diameters, and capillary wall portion thicknesses of the prior art HC-PCF 1200A and the example HC-PCFs 1200B-D are summarized in Table 1, below. As can clearly be seen from FIGS. 12(*a*)-(*d*) and Table 1, the jacket regions 1210B-D of the example HC-PCFs 1200B-D are approximately three times thicker than the jacket region 1210A of the prior art HC-PCF, while the diameters of the hollow cores 1202B-D and the thicknesses of the capillary wall portions of the example HC-PCFs 1200B-D are relatively unchanged from those of the prior art HC-PCF 1200. The thicker jacket regions 1210B-D of the example HC-PCFs 1200B-D therefore provide thicker outer diameters of the example HC-PCFs 1200B-D compared with that of the prior art HC-PCF 1200A.

TABLE 1

| Parameter | Prior art, 1200A | Example fiber 1, 1200B | Example fiber 2, 1200C | Example fiber 3, 1200D |
|---|---|---|---|---|
| Hollow core diameter (μm) | ~31 | ~33 | ~30 | ~32 |
| Jacket thickness (μm) | ~21 | ~61 | ~59 | ~57 |
| Outer diameter (μm) | ~108 | ~180 | ~173 | ~170 |
| Capillary wall portion thickness (nm) | ~150 | <174 | <164 | <170 |

A thick jacket region 110, and/or a thick outer diameter 170, is desirable for improved strength (for example tensile strength) of the optical fiber 100, making the optical fiber 100 less prone to breaking than known HC-PCFs.

In use, it may be that the optical fiber 100 is not supported along its entire length (for example on a surface). At least for some applications, the optical fiber 100 may be sufficiently long that such support is not practical. For this reason, typically photonic crystal fibers are often supported using a plurality of discrete, spaced-apart local mounts or clamps. For example, in use, the optical fiber 100 may be clamped at each end of the fiber (and one or more intermediate clamps may be provided therebetween). Mounting the optical fiber 100 in this way will introduce specific local external stress to the optical fiber 100. Similarly, any bending of the optical fiber 100 (which may be desired in a particular application) will also introduce specific local external stress to the fiber.

The ability of the optical fiber 100 to achieve effective guiding and confinement of radiation in the fiber 100 may be largely governed by the internal dimensions of the fiber 100. That is, the hollow core diameter 114, the arrangement of the capillaries 104, the thickness 160 of the capillary wall portions 105, and/or the shape and dimensions of the cavities 106. It will be understood that these parameters are therefore generally constrained within a certain range of acceptable values, outside of which a HC-PCF will not function correctly. Examples of possible such constraints on these parameters are described in European Patent application number EP 3136143 A1, which is incorporated herein by reference.

An example method of manufacturing a HC-PCF will now be briefly described. It will be appreciated that other manufacturing methods may be applied alternatively or in combination with the method described herein. Detailed examples of methods of manufacturing HC-PCFs are known in the art, for example as described in EP 3136143 A1. It will be appreciated that the manufacturing method briefly described herein may comprise additional steps that are omitted for clarity.

In a first manufacturing step, a glass preform is made, typically by incorporating thin-walled glass tubes (some mm in outer diameter) into a hollow jacket (some cm in diameter). The thin-walled glass tubes are mechanically fixed to the jacket.

In a second manufacturing step, the glass preform is then fed into a furnace where heat is applied making the glass viscous (around 1900-2000 degrees C.).

In a third manufacturing step, the preform is drawn down to a fiber by pulling at the fiber end faster than feeding the preform into the furnace. The inner hollow structure can be modified by applying over/under pressure with respect to the environment. It may be that each hollow region (e.g., capillaries 104 and hollow core 102) can experience a different over/under pressure.

In a fourth manufacturing step, the fiber is then collected on a spool.

As illustrated in FIGS. 12(*b*)-(*d*), the inner cladding regions of the example HC-PCFs 1200B-D have clearly visible hexagonal cross-sections. As described above, a hexagonal cross-section of the inner cladding region can be advantageous in placing the capillaries 104. It will be appreciated, however, that other shapes are possible with respect to the inner cladding region cross-section.

In an embodiment, the jacket region 110 is formed from a material that comprises glass. That is, the material comprises an amorphous (i.e. non-crystalline) material that exhibits a glass transition when heated to a transition temperature. For example, the material may comprise a silica glass. For example, parts of the optical fiber 100 (for example the capillaries 104 and the jacket region 110) may comprise any of the following: high purity silica ($SiO_2$) (for example the F300 material as marketed by Heraeus Holding GmbH of Germany); soft glasses such as for example lead-silicate glass (for example the SF6 glass marketed by Schott AG of Germany); or other specialty glasses such as for example chalcogenide glass or heavy metal fluoride glasses (also referred to as ZBLAN glasses). Advantageously, glass materials do not outgas.

Figure 9:
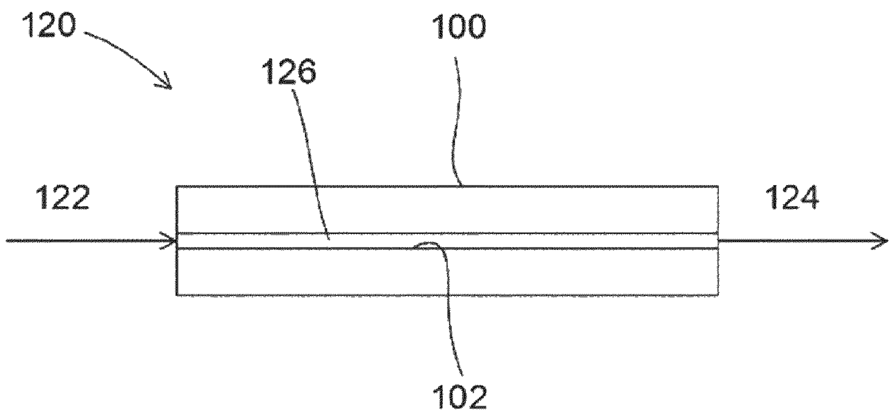
FIG. 9 depicts an apparatus for broadening the frequency range of received input radiation, the apparatus comprising the optical fiber shown in FIGS. 7 and 8.

FIG. 9 shows schematically a general set up for an apparatus 120 for receiving input radiation 122 and broadening a frequency range of the input radiation 122 so as to provide broadband output radiation 124. The apparatus 120 comprises the optical fiber 100 with a hollow core 102 for guiding radiation propagating through the optical fiber 100. It will be appreciated that in order to aid the clarity of the figure only the hollow core 102 of the optical fiber 100 is shown in FIG. 9 (and the cladding and support portions are not distinguished). The apparatus 120 further comprises a gas 126 disposed within the hollow core 102, wherein the gas comprises a working component which enables the broadening of the frequency range of the received input radiation 126 so as to provide broadband output radiation 124.

The working component of the gas 126 may be a noble gas. The working component may comprise one or more of Argon, Krypton, Neon, Helium and Xenon. Alternatively or additionally to the noble gas, the working component may comprise a molecular gas (e.g. $N_2$, $O_2$, $CH_4$, $SF_6$).

In one implementation, the gas 126 may be disposed within the hollow core 102 at least during receipt of input radiation 122 for producing broadband output radiation 124. It will be appreciated that, while the apparatus 120 is not receiving input radiation 122 for producing broadband output radiation, the gas 126 may be wholly or partially absent from the hollow core 102. In general, the apparatus 120 comprises an apparatus for providing the gas 126 within the hollow core 102 of the optical fiber 100. Such apparatus for providing the gas 126 within the hollow core 102 of the optical fiber 100 may comprise a reservoir, as now discussed with reference to FIG. 10.

Figure 10:
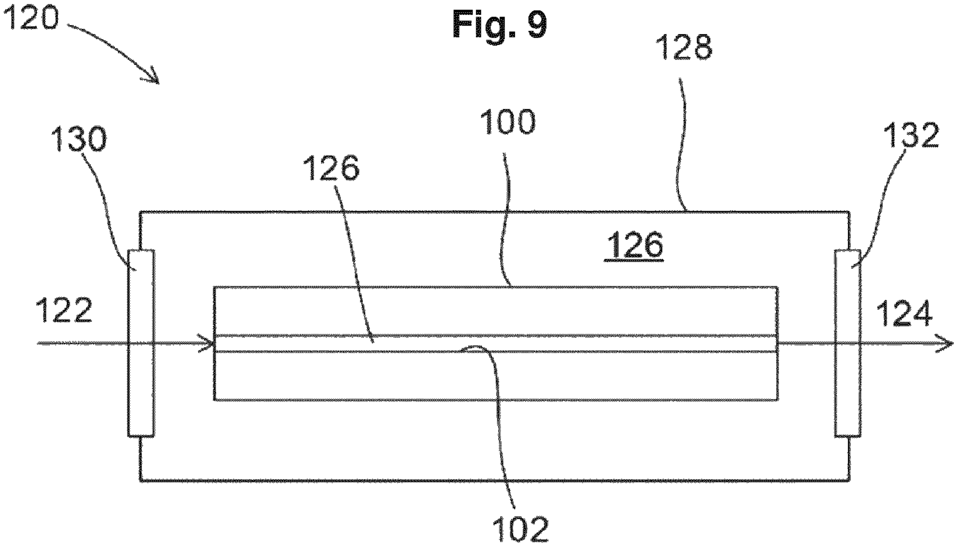
FIG. 10 depicts an apparatus for broadening the frequency range of received input radiation of the type shown in FIG. 9, further comprising a reservoir.

FIG. 10 shows the apparatus 120 as shown in FIG. 9 further comprising a reservoir 128. The optical fiber 100 is disposed inside the reservoir 128. The reservoir 128 may also be referred to as a housing or container. The reservoir 128 is configured to contain gas 126. The reservoir 128 may comprise one or more features, known in the art, for controlling, regulating, and/or monitoring the composition of the gas 126 inside the reservoir 128. The reservoir may comprise a first transparent window 130. In use, the optical fiber 100 is disposed inside the reservoir 128 such that the first transparent window 130 is located proximate to an input end of the optical fiber 100. The first transparent window 130 may form part of a wall of the reservoir 128. The first transparent window 130 may be transparent for at least the received input radiation frequencies, so that received input radiation 122 (or at least a large portion thereof) may be coupled into the optical fiber 100 located inside reservoir 128. The reservoir 128 may comprise a second transparent window 132, forming part of a wall of the reservoir 128. In use, when the optical fiber 100 is disposed inside the reservoir 128, the second transparent window 132 is located proximate to an output end of the optical fiber 100. The second transparent window 132 may be transparent for at least the frequencies of the broadband output radiation 124 of the apparatus 120.

Alternatively, in another embodiment, the two opposed ends of the optical fiber 100 may be placed inside different reservoirs. The optical fiber 100 may comprise a first end section configured to receive input radiation 122, and a second end section for outputting broadband output radiation 124. The first end section may be placed inside a first reservoir, comprising a gas 126. The second end section may be placed inside a second reservoir, wherein the second reservoir may also comprise a gas 126. The functioning of the reservoirs may be as described in relation to FIG. 10 above. The first reservoir may comprise a first transparent window, configured to be transparent for input radiation 122. The second reservoir may comprise a second transparent window configured to be transparent for broadband output broadband radiation 124. The first and second reservoirs may also comprise a sealable opening to permit the optical fiber 100 to be placed partially inside and partially outside the reservoir, so that the gas is sealed inside the reservoir. The optical fiber 100 may further comprise a middle section not contained inside a reservoir. Such an arrangement using two separate gas reservoirs may be particularly convenient for embodiments wherein the optical fiber 100 is relatively long (for example when the length is more than 1 m). It will be appreciated that for such arrangements which use two separate gas reservoirs, the two reservoirs (which may comprise one or more features, known in the art, for controlling, regulating, and/or monitoring the composition of the gas 126 inside the two reservoirs) may be considered to provide an apparatus for providing the gas 126 within the hollow core 102 of the optical fiber 100.

In this context a window may be transparent for a frequency if at least 50%, 75%, 85%, 90%, 95%, or 99% of incident radiation of that frequency on the window is transmitted through the window.

Both the first 130 and the second 132 transparent windows may form an airtight seal within the walls of the reservoir 128 so that the gas 126 may be contained within the reservoir 128. It will be appreciated that the gas 126 may be contained within the reservoir 128 at a pressure different to the ambient pressure of the reservoir 128.

In order to achieve frequency broadening high intensity radiation may be desirable. An advantage of having a hollow core optical fibre 100 is that it may achieve high intensity radiation through strong spatial confinement of radiation propagating through the optical fiber 100, achieving high localised radiation intensities. In addition, hollow core designs (for example as compared to solid core designs) can result in higher quality transmission modes (for example, having a greater proportion of single mode transmission). The radiation intensity inside the optical fiber 100 may be high, for example due to high received input radiation intensity and/or due to strong spatial confinement of the radiation inside the optical fiber 100.

An advantage of using a hollow core optical fiber 100 may be that the majority of the radiation guided inside the optical fiber 100 is confined to the hollow core 102. Therefore, the majority of the interaction of the radiation inside the optical fiber 100 is with the gas 126, which is provided inside the hollow core 102 of the optical fiber 100. As a result, the broadening effects of the working component of the gas 126 on the radiation may be increased.

The received input radiation 122 may be electromagnetic radiation. The input radiation 122 may be received as pulsed radiation. For example, the input radiation 122 may comprise ultrafast pulses. The mechanism for the spectral broadening as the radiation interacts with the gas 126 may be for example one or more of four-wave mixing, modulation instability, ionisation of the working gas, Raman effects, Kerr nonlinearity, soliton formation, or soliton fission. In particular, the spectral broadening may be achieved through one or both of soliton formation, or soliton fission.

The input radiation 122 may be coherent radiation. The input radiation 122 may be collimated radiation, and advantage of which may be to facilitate and improve the efficiency of coupling the input radiation 122 into the optical fiber 100. The input radiation 122 may comprise a single frequency, or a narrow range of frequencies. The input radiation 122 may be generated by a laser. Similarly, the output radiation 124 may be collimated and/or may be coherent.

The broadband range of the output radiation 124 may be a continuous range, comprising a continuous range of radiation frequencies. The output radiation 124 may comprise supercontinuum radiation. Continuous radiation may be beneficial for use in a number of applications, for example in metrology applications. For example, the continuous range of frequencies may be used to interrogate a large number of properties. The continuous range of frequencies may for example be used to determine and/or eliminate a frequency dependency of a measured property. Supercontinuum output radiation 124 may comprise for example electromagnetic radiation over a wavelength range of 100 nm-4000 nm. The broadband output radiation 124 frequency range may be for example 400 nm-900 nm, 500 nm-900 nm, or 200 nm-2000 nm. The supercontinuum output radiation 124 may comprise white light.

Figure 11:
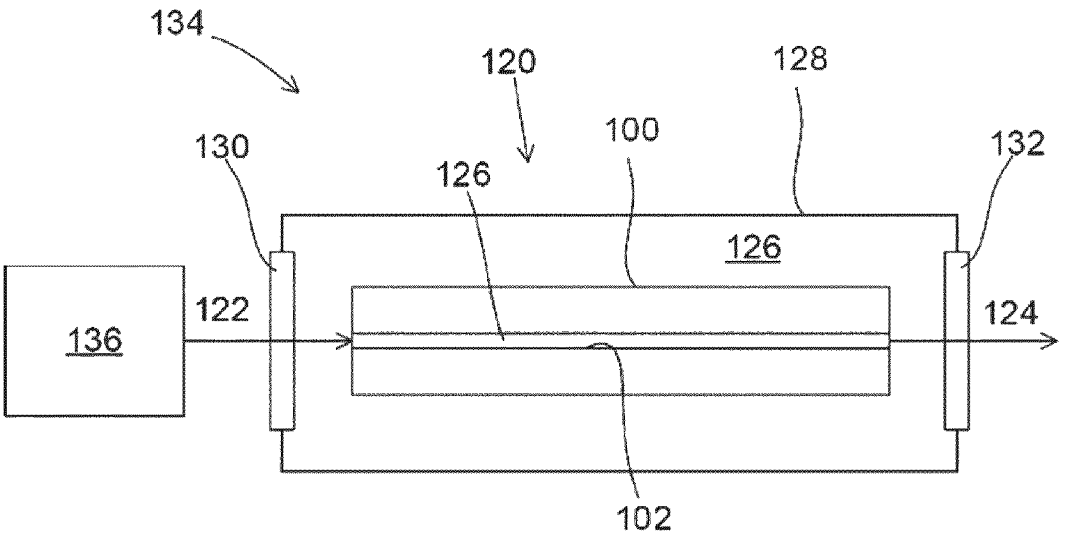
FIG. 11 depicts a schematic representation of a radiation source for providing broadband output radiation, the radiation source comprising the apparatus for broadening the frequency range of received input radiation as shown in FIG. 10.

FIG. 11 depicts a radiation source 134 for providing broadband output radiation. The radiation source 134 comprises an apparatus 120 as described above with reference to FIG. 10. The radiation source 34 further comprises an input radiation source 136 configured to provide input radiation 122 to the apparatus 120. The apparatus 120 may receive input radiation 122 from the input radiation source 136, and broaden it to provide output radiation 124.

The input radiation 122 provided by the input radiation source 136 may be pulsed. The input radiation 122 may comprise electromagnetic radiation of one or more frequencies between 200 nm and 2 μm. The input radiation 122 may for example comprise electromagnetic radiation with a wavelength of 1.03 μm. The repetition rate of the pulsed radiation 122 may be of an order of magnitude of 1 kHz to 100 MHz. The pulse energies may have an order of magnitude of 0.1 μJ to 100 μJ, for example 1-10 μJ. A pulse duration for the input radiation 122 may be between 10 fs and 10 ps, for example 300 fs. The average power of input radiation 122 may be between 100 mW to several 100 W. The average power of input radiation 122 may for example be 20-50 W.

The broadband output radiation 124 provided by the radiation source 134 may have an average output power of at least 1 W. The average output power may be at least 5 W. The average output power may be at least 10 W. The broadband output radiation 124 may be pulsed broadband output radiation 124. The broadband output radiation 124 may have a power spectral density in the entire wavelength band of the output radiation of at least 0.01 mW/nm. The power spectral density in the entire wavelength band of the broadband output radiation may be at least 3 mW/nm.

The radiation source 134 described above may be provided as part of a metrology arrangement for determining a parameter of interest of a structure on a substrate. The structure on the substrate may for example be a lithographic pattern applied to the substrate. The metrology arrangement may further comprise an illumination sub-system for illuminating the structure on the substrate. The metrology arrangement may further comprise a detection sub-system for detecting a portion of radiation scattered and/or reflected by the structure. The detection sub-system may further determine the parameter of interest on the structure from the portion of radiation scattered and/or reflected by the structure. The parameter may for example be overlay, alignment, or levelling data of the structure on the substrate.

The embodiments disclosed so far all relate to the use of an optical fiber, typically a HC-PCF, for generation of broadband radiation upon receiving pump radiation. The optical fibers being characterized as having at least a certain degree of flexibility, possibly having a thicker jacket region to reduce its fragility and/or susceptibility to stress induced at its mounting interfaces. However even such adapted optical fibers may still require relatively complicated integration into the broadband source system (including alignment to in-coupling optics, mounting the fiber, etc.) due to its still flexible nature and relatively small dimensions. In addition stress related issues may still occur, albeit it to a lesser extent compared to typical optical fibers having a thin jacket region.

It is proposed in this document to provide a rigid optical element which is configured to provide broadband radiation upon receiving the pump radiation. In an embodiment the rigid optical element is a monolithic optical element comprising one or more core regions, each core region enclosed by a cladding region, wherein the cladding region(s) are embedded in a supporting region which is dimensioned such that it provides sufficient rigidity to the optical element in order to be less fragile and less sensitive to stress induced by mounting forces. Typically the supporting region is dimensioned at a mm scale (for example 0.5, 1, 1.5, 2, 2.5 or 5 mm or any value in between), rather than a ~100 um scale of a corresponding jacket region of an optical fiber implementation. The proposed monolithic optical element is mechanically more robust than an optical fiber implementation, while functionally it is equivalent to said optical fiber, providing wavelength spectrum broadening based on the same physical principles compared to a HC-PCF based implementation.

In an embodiment the core region and cladding region of such a monolithic optical element are configured in accordance with previously disclosed dimensions and geometries associated with an optical fiber. The core region may have a diameter, for example, between 5 um and 60 um, between 10 and 30 um or between 15 and 25 um.

The cladding region may be configured in accordance with a single ring configuration of capillaries, wherein the wall thickness of said capillaries are configured to act as anti-resonant elements as described in detail in the previous sections related to HC-PCF implementations.

As the core and cladding region(s) are embedded within a rigid support region, typically made from a glass (like) material, the monolithic optical element as such is substantially rigid, easier to handle during integration within a broadband source system and mounting such an element is significantly easier than a relatively thin optical fiber. Due to the larger volume of material within such a monolithic optical element also the mounting force induced stress components will have a smaller magnitude.

Figure 13:
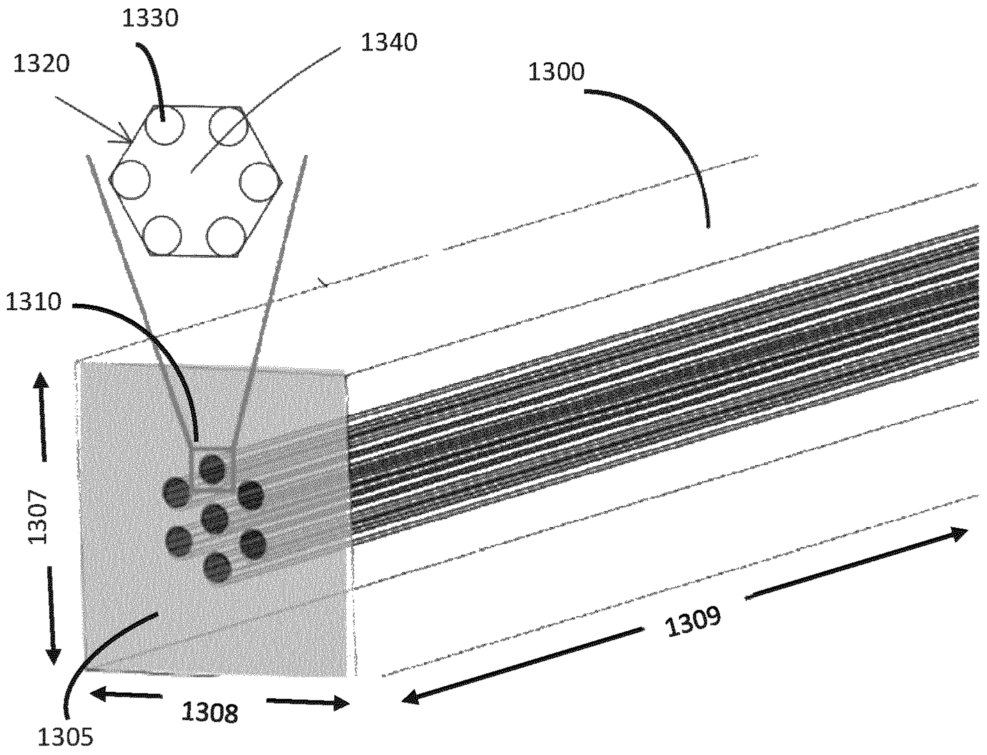
FIG. 13 depicts a monolithic optical element for broadband radiation generation according to an embodiment of the invention.

Further reference is made to FIG. 13 depicting a monolithic optical element according to an embodiment of the invention. The monolithic optical element 1300 comprises a glass (like) host material 1305 (the supporting region) enclosing at least one waveguide like hollow structure 1310, each structure 1310 comprising a hollow core region 1340 enclosed by a cladding region 1320. The cladding region is micro-structured, for example in accordance with a ring like configuration of capillaries 1330, each capillary being hollow and having a wall thickness in accordance with a desired anti-resonance mechanism. Typically the capillaries have a diameter smaller than the core region (as is the case for most HC-PCF configurations). FIG. 13 demonstrates a hexagonal arrangement of capillaries, but in practice other arrangements may be selected, such as a circular arrangement (see FIG. 12(*a*)-(*d*)).

To provide the required rigidity to the element 1300 the dimensions 1307 (vertical) and/or 1308 (horizontal) are configured to be large enough. Typically the longitudinal dimension 1309 of the element 1300 is much larger than the dimensions 1307/1308 rendering the element 1300 to be substantially an elongated volume. In an example the dimension 1307 and/or 1308 of the supporting region 1305 exceeds 1.5 mm providing sufficient stiffness to the monolithic optical element 1300 to be handled and fixated with greater ease than an optical fiber (typically having an outer diameter of 0.2 mm). In general the stiffness improves with an increase of the outer diameter by at least a power of 3 as the area moment of inertia of the optical element or fiber scales with the outer diameter with a power of 4.

In the example of FIG. 13 a configuration of 7 individual hollow structures 1310 is depicted, each structure 1310 configured to generate broadband radiation upon receiving pump radiation at its corresponding input end (corresponding to 122 in FIG. 9). The mechanism of the broadband radiation generation process is typically identical to the process occurring in state of the art HC-PCF solutions. The material of the supporting region and capillaries are typically similar or identical to the material, typically a glass (like) material, used for currently used HC-PCF's. The dimensions of the hollow core region and cladding region structures of the monolithic optical element are also substantially identical to the dimensions of equivalent regions and structures used in state of the art HC-PCF's.

The monolithic optical element of FIG. 13 comprises a plurality of cladding and corresponding hollow core regions. In an embodiment the core region and/or cladding region maybe dimensioned and structured substantially identical to each other (basically they are more or less copies from each other). A monolithic optical element 1300 comprising a plurality of hollow structures may for example be used to simultaneously generate broadband generation upon receiving pump radiation at the input ends of said hollow structures. Additionally the plurality of hollow structures may provide redundancy, for example allowing the input radiation (pump radiation) initially providing radiation to a first hollow core region to be re-directed to another (second) hollow core region corresponding to another hollow structure than the hollow structure comprising the first hollow core region. The aspect of providing redundancy may extend the lifetime of the optical element 1300; degradation of a first hollow core region (for example due to glass formation at its output end) may be followed by a switch to another (still clean) hollow core region, obviating the need to replace the monolithic optical element 1300.

In another embodiment the plurality of hollow core regions and/or cladding regions (including capillaries) are dimensioned and/or structured substantially different from each other. For example a first hollow core region has a diameter optimized to receive pump radiation comprising pulses having a first energy and a second hollow core region has a diameter optimized to receive pump radiation comprising pulses having a second energy. In another example a first cladding region comprises capillaries of a first diameter and a first wall thickness configured to provide broadband radiation having a first wavelength spectrum. A second cladding region comprises capillaries of a second diameter and a second wall thickness configured to provide broadband radiation having a second wavelength spectrum, different from the first wavelength spectrum.

The monolithic optical element may be manufactured in line with currently deployed manufacturing methods of HC-PCFs, for example according to methods described earlier in this document. Important difference for the manufacturing process is the use of a particular preform, instead of a hollow jacket measuring some mm to some cm in diameter, a hollow volume is used having transversal dimensions exceeding for example 5 cm, typically more than 10, 20, 30, 40 cm.

In a first manufacturing step, a glass preform is made, typically by incorporating thin-walled glass tubes (some mm in outer diameter) into the hollow volume (typically 5-40 cm in diameter). The thin-walled glass tubes are mechanically fixed to the inner surface of the hollow volume.

In a second manufacturing step, the glass preform is then fed into a furnace where heat is applied making the glass viscous (around 1900-2000 degrees C.).

In a third manufacturing step, the preform is drawn down to an elongated volume by pulling at the preform end faster than feeding the preform into the furnace. The inner hollow structures 1330 can be modified by applying over/under pressure with respect to the environment. It may be that each hollow region (e.g., capillaries 1330 and hollow core 1340) can experience a different over/under pressure.

In an alternative manufacturing method the monolithic optical element is manufactured without any drawing process; an elongated glass volume is patterned by exposing a transversal plane of the volume to suitable radiation, such as (femtosecond) laser pulses, the patterning representing the size and locations of the capillaries 1330 and the hollow core region 1340. Due to the exposures the chemical properties of the glass are changed locally such that they become etchable by a suitable etchant (for example hydrofluoric acid). By performing an etch step the elongated glass volume is provided with hollow tubes (capillaries 1330) and one or more hollow cores 1340. Hence the patterning is configured to yield the previously described monolithic optical element for broadband radiation generation.

The monolithic optical element may further be provided with additional features to improve temperature regulation of the element 1300, gas pressure and/or temperature within the capillaries 1330 and hollow core region 1340 and/or surface of the element 1300 to accurately mount the optical element 1300 such that is aligned properly to for example in-coupling optics of the broadband source.

For example the supporting region 1305 may further comprise one or more channels configured to circulate a fluid for regulating the temperature of at least a part of one or more of the hollow core region 1340, the cladding region 1320 or the supporting region 1305.

The supporting region 1305 may further comprise one or more channels configured to introduce or evacuate a gas filling the hollow core region 1340 and/or the micro-structures 1330 comprised within the cladding region 1320.

The supporting region may comprise means for attaching the monolithic optical element 1300 to an element for holding the optical element 1300. The element may be an accurately adjusted interface to ensure a proper alignment in one or more degrees of freedom of the optical element 1300 with respect to an optical reference of for example the pump laser or in-coupling optics of the broadband source 134. The attaching means on the monolithic optical element 1300 may for example be accurately adjusted to ensure proper alignment of the pump laser beam with respect to the (center of) the hollow core region 1340.

The supporting region 1305 may be provided locally with recesses configured to: a) reduce a local stiffness along the longitudinal axis to allow the optical element 1300 to expand or shrink during thermal load under operation of the source 134 and/or b) make the optical element 1300 locally flexible to enable guiding of the optical element 1300 along a (slightly) curved path without using a fiber based solution.

Further embodiments of the invention are disclosed in the list of numbered clauses below:

1. A monolithic optical element for generating broadband radiation upon receiving input radiation at an input end of the optical element, the optical element comprising: a hollow core region for guiding the input radiation along a longitudinal axis of the optical element towards and output end of the optical element; a cladding region surrounding the hollow core region along the longitudinal axis and comprising transversally arranged micro-structures configured to provide non-linear optical behaviour to the optical element causing the generation of the broadband radiation; and a supporting region surrounding the cladding region along the longitudinal axis of at least part of the optical element, characterized in that the supporting region has a transversal dimension which is sufficiently large to render said at least part of the optical element substantially rigid.

2. The optical element of clause 1, wherein the hollow core region has a diameter of 60 um or smaller.
3. The optical element of clause 1 or 2, wherein the transversal dimension of the supporting region is larger than any of: 500 um, 1 mm, 1.5 mm, 2.5 mm or 5 mm.
4. The optical element of any preceding clause, wherein the micro-structures are hollow tubular elements (capillaries) extending along the longitudinal axis of the optical element.
5. The optical element of clause 4, wherein the micro-structures have a diameter smaller than the diameter of the hollow core region.
6. The optical element of clause 4 or 5, wherein the micro-structures are, when viewed in a plane transversal to the longitudinal axis, arranged in a ring or polygon shaped configuration around the hollow core region.
7. The optical element of clause 6, wherein the micro-structures are arranged in a hexagonal configuration.
8. The optical element of any preceding clause, wherein the supporting region and micro-structures are made from a material having glass-like mechanical properties.
9. The optical element of any of clauses 1 to 7, wherein the supporting region and micro-structures are made from a glass material.
10. The optical element of any preceding clause, wherein the input radiation has a wavelength in the infra-red region and the wavelength spectrum of the broadband radiation at the output end covers at least a range of 400 to 900 nm.
11. The optical element of any preceding clause, wherein the supporting region extends along the entire length of the optical element.
12. The optical element of any preceding clause, wherein the supporting region further comprises one or more channels configured to circulate a fluid for regulating the temperature of at least a part of one or more of: the hollow core region, the cladding region, the supporting region.
13. The optical element of any preceding clause, wherein the supporting region further comprises one or more channels configured to introduce or evacuate a gas to or from the hollow core region and/or the micro-structures comprised within the cladding region.
14. The optical element of any preceding clause, wherein the supporting region comprises means for attaching the monolithic optical element to an element for holding the optical element.
15. The optical element of any preceding clause, wherein the supporting region comprises locally applied recesses configured to: a) reduce a local stiffness along the longitudinal axis to allow the optical element to expand or shrink and/or b) make the optical element locally flexible to enable guiding of the optical element along a curved path.
16. The monolithic optical element of any preceding clause, wherein the supporting region surrounds at least a further hollow core region and a further cladding region surrounding said further hollow core region.
17. The optical element of clause 16, wherein the further hollow core region and further cladding region are dimensioned and structured substantially identical to respectively the hollow core region and cladding region.
18. The optical element of clause 16, wherein the further hollow core region and/or further cladding region are dimensioned and structured substantially different from respectively the hollow core region and/or cladding region.
19. The optical element of clause 18, wherein the further hollow core and/or cladding region is configured to provide a different broadening of the wavelength spectrum than the hollow core and/or cladding region.
20. The optical element of clause 18 or 19, wherein the further hollow core region has a smaller diameter compared to the hollow core region diameter to enable said broadening of the wavelength spectrum at a reduced pulse energy of the radiation provided to the input end.
21. The optical element of any of clauses 16 to 20, wherein the hollow core region, cladding region, further hollow core region and further cladding region are arranged parallel to the longitudinal axis along at least part of the optical element.
22. A monolithic optical element, the optical element comprising: a plurality of hollow core regions, each core region configured for guiding radiation provided to an input end of the optical element along a longitudinal axis of the optical element; a plurality of cladding regions, each cladding region surrounding a corresponding core region along the longitudinal axis and comprising transversally arranged micro-structures configured to confine the radiation to its corresponding core region; and a supporting region surrounding the plurality of cladding regions along the longitudinal axis.
23. A monolithic optical element for generating broadband radiation, the optical element comprising:
    a first hollow core region for guiding radiation provided to a first input end of the optical element along a longitudinal axis of the optical element; a second hollow core region for guiding radiation provided to a second input end of the optical element along a longitudinal axis of the optical element; a first cladding region surrounding the first hollow core region along the longitudinal axis and comprising transversally arranged micro-structures configured to provide non-linear optical behavior to the first core region causing said generating of broadband radiation; a second cladding region surrounding the second hollow core region along the longitudinal axis and comprising transversally arranged micro-structures configured to provide non-linear optical behavior to the second core region causing said generating of broadband radiation; and a supporting region surrounding the cladding regions along the longitudinal axis.
24. A preform for a drawing process configured to manufacture the monolithic optical element of any preceding clause, the preform comprising: an arrangement of hollow tubes connected to a host material having at least one transversal dimension of at least 5 cm and made of a glass (like) material, the arrangement of hollow tubes surrounding a hollow core region within the host material.

25. The use of the monolithic optical element according to any of clauses 1 to 23 in generating broadband radiation.
26. A broadband radiation source comprising a pump laser and the monolithic optical element of any of clauses 1 to 23 configured to receive radiation provided by the pump laser.
27. A method of manufacturing the monolithic optical element according to any of clauses 1-23, the method comprising: providing the preform of clause 24; and heating and drawing the preform.
28. A method of manufacturing the monolithic optical element according to any of clauses 1-23, the method comprising: providing a glass volume; patterning a transversal plane of the volume in accordance with a desired arrangement of one or more hollow core regions and micro-structures surrounding the one or more hollow core regions, wherein the patterning is based on locally changing a chemical property of the glass volume by exposing it to pulsed radiation; and selectively etch the exposed parts to form hollow tubes and at least one hollow core region.

The metrology arrangement in this document may form part of a metrology apparatus MT. The metrology arrangement described above may form part of an inspection apparatus. The metrology arrangement described above may be included inside a lithographic apparatus LA.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

Although specific reference is made to "metrology apparatus/tool/system" or "inspection apparatus/tool/system", these terms may refer to the same or similar types of tools, apparatuses or systems. E.g. the inspection or metrology apparatus that comprises an embodiment of the invention may be used to determine characteristics of structures on a substrate or on a wafer. E.g. the inspection apparatus or metrology apparatus that comprises an embodiment of the invention may be used to detect defects of a substrate or defects of structures on a substrate or on a wafer. In such an embodiment, a characteristic of interest of the structure on the substrate may relate to defects in the structure, the absence of a specific part of the structure, or the presence of an unwanted structure on the substrate or on the wafer.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A monolithic optical element for generating broadband radiation upon receiving input radiation at an input end of the optical element, the optical element comprising:

a hollow core region configured to guide input radiation along a longitudinal axis of the optical element towards an output end of the optical element;

a cladding region surrounding the hollow core region along the longitudinal axis and comprising transversally arranged micro-structures configured to provide non-linear optical behaviour to the optical element causing the generation of the broadband radiation; and a supporting region surrounding the cladding region along the longitudinal axis of at least part of the optical element, wherein the supporting region has a transversal dimension to provide rigidity to the at least part of the optical element, and wherein the supporting region surrounds at least a further hollow core region configured to guide input radiation along a longitudinal axis of the optical element towards an output end of the optical element and a further cladding region surrounding the further hollow core region.

2. The monolithic optical element of claim 1, wherein the hollow core region has a diameter of 60 μm or smaller.

3. The monolithic optical element of claim 1, wherein the transversal dimension of the supporting region is larger than 0.5 mm.

4. The monolithic optical element of claim 1, wherein the micro-structures are hollow tubular elements (capillaries) extending along the longitudinal axis of the optical element.

5. The monolithic optical element of claim 4, wherein the micro-structures have a diameter smaller than a diameter of the hollow core region.

6. The monolithic optical element of claim 4, wherein the micro-structures are, when viewed in a plane transversal to the longitudinal axis, arranged in a ring or polygon shaped configuration around the hollow core region.

7. The monolithic optical element of claim 6, wherein the micro-structures are arranged in a hexagonal configuration.

8. The monolithic optical element of claim 1, wherein the supporting region and micro-structures are made from a glass material.

9. The monolithic optical element of claim 1, wherein the input radiation has a wavelength in the infra-red region and the wavelength spectrum of the broadband radiation at the output end covers at least a range of 400 to 900 nm.

10. The monolithic optical element of claim 1, wherein the supporting region further comprises one or more channels configured to circulate a fluid for regulating the temperature of at least a part of one or more selected from: the hollow core region, the cladding region, the supporting region.

11. The monolithic optical element of claim 1, wherein the further hollow core region and further cladding region are dimensioned and structured substantially identical to respectively the hollow core region and cladding region.

12. The monolithic optical element of claim 1, wherein the further hollow core region and/or further cladding region are dimensioned and structured substantially different from respectively the hollow core region and/or cladding region.

13. The monolithic optical element of claim 12, wherein the further hollow core and/or further cladding region are configured to provide a different broadening of the wavelength spectrum than the hollow core and/or cladding region.

14. The monolithic optical element of claim 12, wherein the further hollow core region has a smaller diameter compared to the hollow core region diameter to enable the broadening of the wavelength spectrum at a reduced pulse energy of the radiation provided to the input end.

15. A broadband radiation source comprising a pump laser and the monolithic optical element of claim 1, configured to receive radiation provided by the pump laser.

16. A monolithic optical element, the optical element comprising:

a plurality of hollow core regions, each core region configured to guide radiation provided to an input end of the optical element along a longitudinal axis of the optical element;

a plurality of cladding regions, each cladding region surrounding a corresponding core region along the longitudinal axis and comprising transversally arranged micro-structures configured to confine the radiation to its corresponding core region; and a supporting region surrounding the plurality of cladding regions along the longitudinal axis.

17. The monolithic optical element of claim 16, wherein the input radiation has a wavelength in the infra-red region and the wavelength spectrum of the broadband radiation at the output end covers at least a range of 400 to 900 nm.

18. A broadband radiation source comprising a pump laser and the monolithic optical element of claim 16 configured to receive radiation provided by the pump laser.

19. A monolithic optical element for generating broadband radiation, the optical element comprising:

a first hollow core region configured to guide radiation provided to a first input end of the optical element along a longitudinal axis of the optical element;

a second hollow core region configured to guide radiation provided to a second input end of the optical element along a longitudinal axis of the optical element;

a first cladding region surrounding the first hollow core region along the longitudinal axis and comprising transversally arranged micro-structures configured to provide non-linear optical behavior to the first core region causing the generating of broadband radiation;

a second cladding region surrounding the second hollow core region along the longitudinal axis and comprising transversally arranged micro-structures configured to provide non-linear optical behavior to the second core region causing the generating of broadband radiation; and a supporting region surrounding the cladding regions along the longitudinal axis.

20. A broadband radiation source comprising a pump laser and the monolithic optical element of claim 19 configured to receive radiation provided by the pump laser.

* * * * *